:::
United States Patent
Umayabashi et al.

(12) United States Patent
(10) Patent No.: US 8,737,238 B2
(45) Date of Patent: May 27, 2014

(54) CONGESTION DETECTING METHOD AND COMMUNICATION NODE

(75) Inventors: Masaki Umayabashi, Tokyo (JP); Zhenlong Cui, Tokyo (JP); Hiroyuki Takagi, Tokyo (JP); Kazuo Takagi, Tokyo (JP)

(73) Assignee: Nec Corporation, Tokyo (JP)

(*) Notice: Subject to any disclaimer, the term of this patent is extended or adjusted under 35 U.S.C. 154(b) by 212 days.

(21) Appl. No.: 13/377,241

(22) PCT Filed: Jun. 11, 2010

(86) PCT No.: PCT/JP2010/059950
§ 371 (c)(1),
(2), (4) Date: Jan. 12, 2012

(87) PCT Pub. No.: WO2010/143712
PCT Pub. Date: Dec. 16, 2010

(65) Prior Publication Data
US 2012/0113820 A1 May 10, 2012

(30) Foreign Application Priority Data
Jun. 11, 2009 (JP) ................. 2009-140312

(51) Int. Cl.
*H04L 12/54* (2013.01)
*H04B 7/14* (2006.01)
*H04W 40/22* (2009.01)
*H04W 28/02* (2009.01)
*H04L 12/26* (2006.01)
*H04W 72/10* (2009.01)

(52) U.S. Cl.
CPC ............... *H04L 12/26* (2013.01); *H04L 12/54* (2013.01); *H04L 43/0882* (2013.01); *H04L 12/569* (2013.01); *H04W 28/02* (2013.01); *H04W 72/10* (2013.01)
USPC ........... 370/249; 370/229; 370/235; 370/241; 370/252; 370/315; 370/225; 370/227; 370/310; 370/352; 709/224; 455/426.1

(58) Field of Classification Search
CPC .............. H04W 48/20; H04W 72/085; H04W 74/0816; H04W 88/04; H04L 12/26; H04L 12/5601; H04L 2012/5631; H04L 2012/5636; H04L 2012/5637; H04L 2012/5651; H04L 43/0864; H04L 43/0882; H04L 43/10
USPC .................................................. 370/228–352
See application file for complete search history.

(56) References Cited

U.S. PATENT DOCUMENTS 6,134,589 A * 10/2000 Hultgren ................... 709/227
6,377,543 B1 * 4/2002 Grover et al. ............. 370/227

(Continued)

FOREIGN PATENT DOCUMENTS

JP 10-243016 9/1998
JP 2004-180051 6/2004

(Continued)

OTHER PUBLICATIONS

International Search Report—PCT/JP2010/059950—Aug. 24, 2010.

*Primary Examiner* — Phirin Sam
*Assistant Examiner* — Venkatesh Haliyur
(74) *Attorney, Agent, or Firm* — Young & Thompson

(57) ABSTRACT

An inspection signal to inspect forward-path or return-path communication, is transmitted from a reference node of a network. A response signal is transmitted in a priority class from a node of a forward path to the reference node. In the case of inspection of return-path communication, a replica of the response signal is transmitted in a non-priority class from the node of the forward path to the return path, and the node that receives the replica of the response signal transfers the replica in a priority class to the reference node. In the case of inspection of forward-path communication, a replica of the inspection signal is transmitted in a non-priority class from the node of the forward path to the forward path, and a replica of the response signal is transmitted in a priority class from the node that receives a replica of the inspection signal to the reference node.

14 Claims, 26 Drawing Sheets

:::

(56) References Cited

U.S. PATENT DOCUMENTS

| | | | |
|---|---|---|---|
| 6,424,624 B1* | 7/2002 | Galand et al. | 370/231 |
| 6,434,134 B1* | 8/2002 | La Porta et al. | 370/338 |
| 6,744,740 B2* | 6/2004 | Chen | 370/255 |
| 6,990,075 B2* | 1/2006 | Krishnamurthy et al. | 370/236 |
| 7,103,371 B1* | 9/2006 | Liu | 455/456.4 |
| 7,319,676 B2* | 1/2008 | Fujino | 370/254 |
| 7,561,549 B2* | 7/2009 | Meier et al. | 370/331 |
| 7,710,872 B2* | 5/2010 | Vasseur | 370/230 |
| 7,720,993 B2* | 5/2010 | Liu et al. | 709/238 |
| 7,940,735 B2* | 5/2011 | Kozisek et al. | 370/338 |
| 7,948,909 B2* | 5/2011 | Bugenhagen et al. | 370/252 |
| 7,995,500 B2* | 8/2011 | Vasseur | 370/254 |
| 8,015,294 B2* | 9/2011 | Bugenhagen et al. | 709/227 |
| 8,094,575 B1* | 1/2012 | Vadlakonda et al. | 370/252 |
| 8,102,770 B2* | 1/2012 | Morrill et al. | 370/235 |
| 8,223,654 B2* | 7/2012 | Bugenhagen | 370/241 |
| 8,307,065 B2* | 11/2012 | McNaughton et al. | 709/224 |
| 8,363,565 B2* | 1/2013 | Fujita et al. | 370/252 |
| 8,509,063 B1* | 8/2013 | Davison et al. | 370/225 |
| 2003/0117966 A1* | 6/2003 | Chen | 370/255 |
| 2003/0174689 A1* | 9/2003 | Fujino | 370/349 |
| 2005/0207349 A1* | 9/2005 | Nagami et al. | 370/241 |
| 2005/0220054 A1* | 10/2005 | Meier et al. | 370/331 |
| 2006/0176884 A1* | 8/2006 | Fair et al. | 370/400 |
| 2007/0133406 A1* | 6/2007 | Vasseur | 370/230 |
| 2008/0002576 A1* | 1/2008 | Bugenhagen et al. | 370/229 |
| 2008/0049649 A1* | 2/2008 | Kozisek et al. | 370/310 |
| 2008/0049769 A1* | 2/2008 | Bugenhagen | 370/401 |
| 2008/0049775 A1* | 2/2008 | Morrill et al. | 370/419 |
| 2008/0052393 A1* | 2/2008 | McNaughton et al. | 709/224 |
| 2008/0052394 A1* | 2/2008 | Bugenhagen et al. | 709/224 |
| 2008/0052401 A1* | 2/2008 | Bugenhagen et al. | 709/227 |
| 2008/0130515 A1* | 6/2008 | Vasseur | 370/254 |
| 2013/0083722 A1* | 4/2013 | Bhargava et al. | 370/315 |
| 2013/0295921 A1* | 11/2013 | Bhargava et al. | 455/426.1 |

FOREIGN PATENT DOCUMENTS

| | | |
|---|---|---|
| JP | 2007-251259 | 9/2007 |
| JP | 2007-259069 | 10/2007 |
| JP | 2008-529381 | 7/2008 |
| JP | 2008-283621 | 11/2008 |
| WO | 2006/085184 | 8/2006 |

* cited by examiner

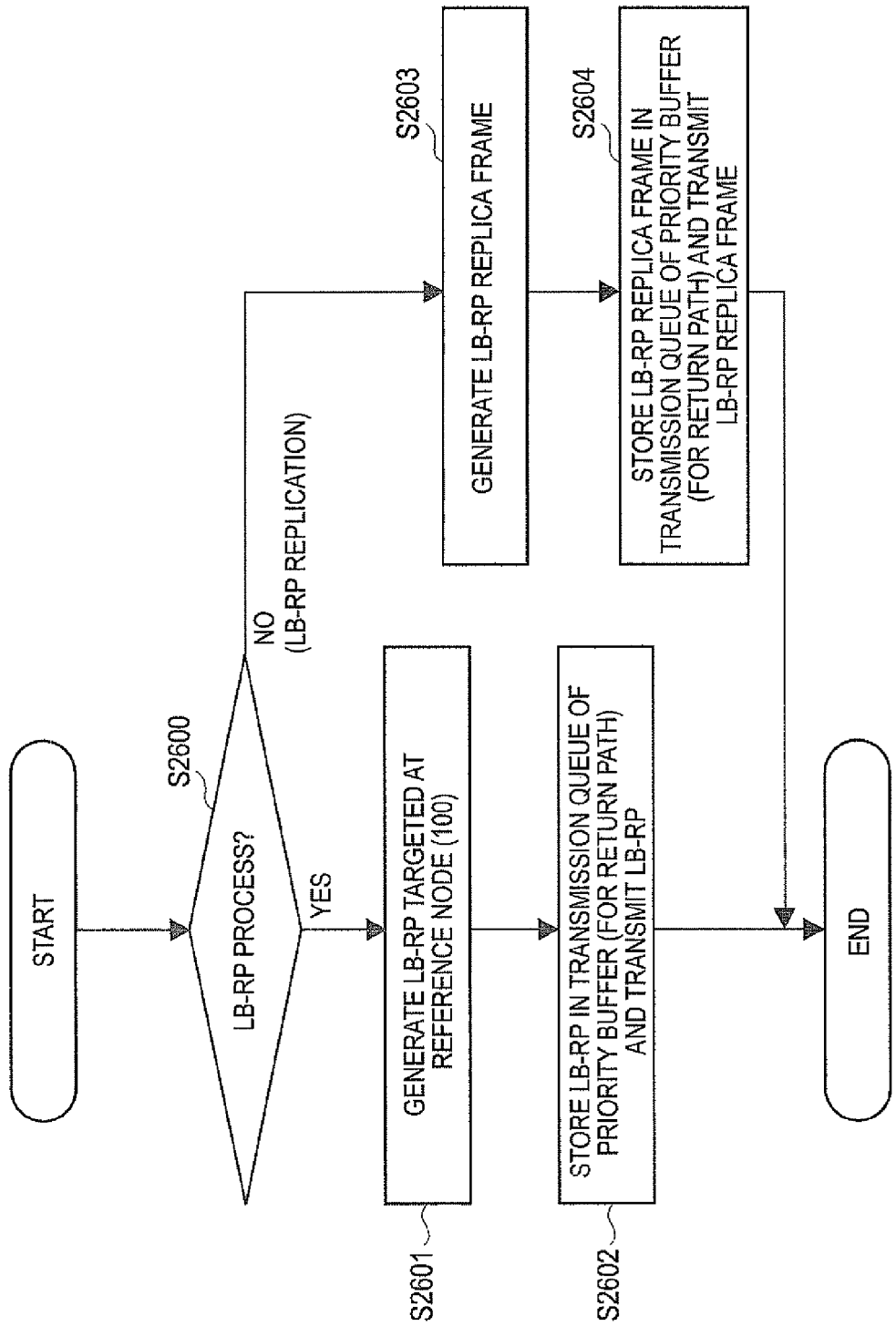

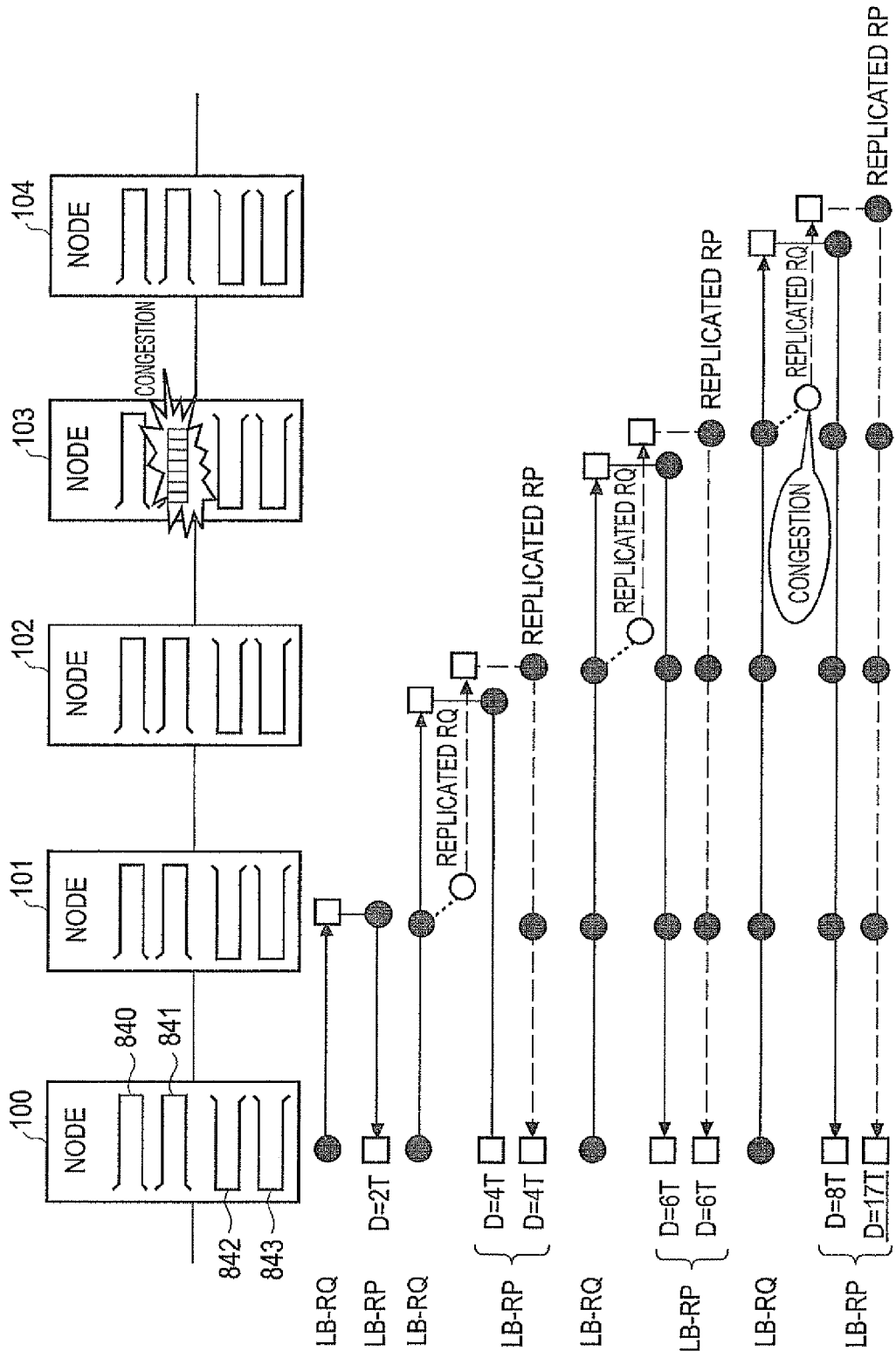

CONGESTION DETECTING METHOD AND COMMUNICATION NODE

TECHNICAL FIELD

The present invention relates to a congestion detection method, by which a node that congestion occurs is detected in a network, and a communication node.

BACKGROUND ART

One of the functions required for a wide area network (WAN) is operations, administration and maintenance: (OAM) function. The OAM function is specified in ITU-T recommendation Y.1731, for example. In Y.1731, a LinkTrace (LT) function, which corresponds to a Traceroute function as an OAM function on the Internet, is specified. The LT function is used to obtain routing information from a node of a network.

FIG. 1 shows how a node 10 uses the LT function to acquire routing information from the local node 10 to a node 14. The node 10 sets the node 14 as a target node and transmits an LT-Request frame (referred to as "LT-RQ," hereinafter) in which a TTL (Time To Live) value is stored. Relay nodes 11, 12 and 13 each subtract "1" from the TTL value before transferring the received LT-RQ; and set the TTL value which is obtained by the subtraction, into an LT-Reply frame (referred to as "LT-RP," hereinafter) and transmit the LT-RP back to the node 10. The node 10 generates routing information to the node 14 on the basis of the TTL value of the LT-RP from each of the nodes 11, 12 and 13. In the example illustrated in the diagram, the TTL values are arranged in descending order. As a result, what is formed is one route that leads from the node 10 to the node 11, from the node 11 to the node 12, from the node 12 to the node 13, and from the node 13 to the node 14 (Node 10→Node 11→Node 12→Node 13→Node 14).

The use of the above LT function makes it possible to identify a location of failure on the route. FIG. 2 shows how a failure occurs in the node 13 on the network shown in the above FIG. 1. In this case, in response to an LT-RQ issued by the node 10, LT-RPs are returned from the nodes 11 and 12. However, no reply is obtained from the node 13 and subsequent nodes in response to the LT-RQ issued by the node 10. As a result, the node 10 recognizes, on the basis of the routing information, that a failure has occurred in the node 13.

By the way, when one node of the network is congested with data, the node could possibly become a performance bottleneck of the network. That is, the node that congestion occurs could be a cause of transmission delay on the route that includes the node. As for congestion of a node, for example, what is disclosed in PTL 1 is a technique for regulating a call originating from a subscriber to a node when congestion occurs in the node.

CITATION LIST

Patent Literature

{PTL 1} JP-A-2004-180051

SUMMARY OF INVENTION

Technical Problem

In the operations, administration and maintenance of a network, what is required is to identify a node that becomes a performance bottleneck. However, the technique of PTL 1 described above is aimed at clearing up, in a node, congestion that occurs in the node. Therefore, it is difficult to perceive the congestion state of the node from outside.

Meanwhile, the use of the above LT function makes it possible for a given node to identify a location of failure on a route. However, it is difficult to identify which node is congested on the route. The reason is that even after congestion occurs in a node, the node is still running. For example, as shown in FIG. 1, when congestion occurs in the node 13, the node 13 is able to transmit a response (LT-RP) to an LT-RQ, to the node 10. Therefore, it is difficult for the node 10 to recognize that congestion has occurred in a node 13.

An exemplary object of the present invention is to provide a congestion detection method, by which a node that congestion occurs on a route of a network is identified from the outside of the node, and a communication node.

Solution to Problem

According to a first exemplary aspect of the present invention, a congestion detection method for a network where a forward path, which leads from a reference node to a turn node via at least one relay node, and a return path, which leads from the turn node to the reference node via at least the one relay node, are set up, the method including: transmitting an inspection signal, which is used to inspect forward-path or return-path communication, from the reference node; transmitting a response signal to the inspection signal in a priority class from each of the relay node and turn node of the forward path, or from the relay node or turn node of the forward path, to the reference node; transmitting a replica of the response signal in a non-priority class from each of the relay node and turn node of the forward path, or from the relay node or turn node of the forward path, to the return path, and transferring the replica in a priority class to the reference node by using the relay node that receives the replica of the response signal, if the inspection signal corresponds to an inspection of return-path communication; transmitting a replica of the inspection signal in a non-priority class from the relay node of the forward path to the forward path, and transmitting a replica of the response signal in a priority class from each of the relay node and turn node that receive the replica of the inspection signal, or from the relay node or turn node that receives the replica of the inspection signal, to the reference node, if the inspection signal corresponds to an inspection of forward-path communication; and calculating a difference between time needed for a response signal, which is transmitted from the relay or turn node, to arrive at the reference node and time needed for a replica thereof, which is transmitted from the same relay or turn node, to arrive at the reference node, and determining, when the arrival-time difference exceeds a threshold value, that congestion occurs in forward-path or return-path communication of the relay or turn node.

According to a second exemplary aspect of the present invention, a communication node that is not a reference node and is for a network where a forward path and a return path are set up, the forward path leading from the reference node to a turn node, and the return path leading from the turn node to the reference node, the communication node which includes a switching unit that transmits, after receiving an inspection signal that is transmitted from the reference node and is used to inspect forward-path or return-path communication, a response signal to the inspection signal in a priority class to the reference node; transmits a replica of the response signal in a non-priority class to the return path if the inspection signal corresponds to an inspection of return-path communication; transfers, after receiving a replica of the response signal, the replica in a priority class to the reference node; transmits a replica of the inspection signal in a non-priority class to the forward path if the inspection signal corresponds to an inspection of forward-path communication; and transmits, after receiving a replica of the inspection signal, the replica of the response signal in a priority class to the reference node.

According to a third exemplary aspect of the present invention, a communication node that works as a reference node and is for a network where a forward path and a return path are set up, the forward path leading from the reference node to a turn node, the return path leading from the turn node to the reference node, the communication node which includes a control unit that transmits an inspection signal used to inspect forward-path or return-path communication; calculates, for the inspection signal, a difference between time needed for a response signal, which is transmitted from a node of the network, to arrive at the reference node and time needed for a replica thereof, which is transmitted from the same node, to arrive at the reference node; and determines, when the arrival-time difference exceeds a threshold value, that congestion occurs in forward-path or return-path communication of the node.

Advantageous Effects of Invention

According to the present invention, a node that congestion occurs on a route of a network can be identified from the outside of the node.

BRIEF DESCRIPTION OF DRAWINGS

FIG. 25 A flowchart as to LB-RP transmission at a time when a forward path is inspected according to the second embodiment of the present invention.

FIG. 26 An explanatory diagram as to a specific example of forward-path inspection according to the second embodiment of the present invention.

DESCRIPTION OF EMBODIMENTS

Figure 1:
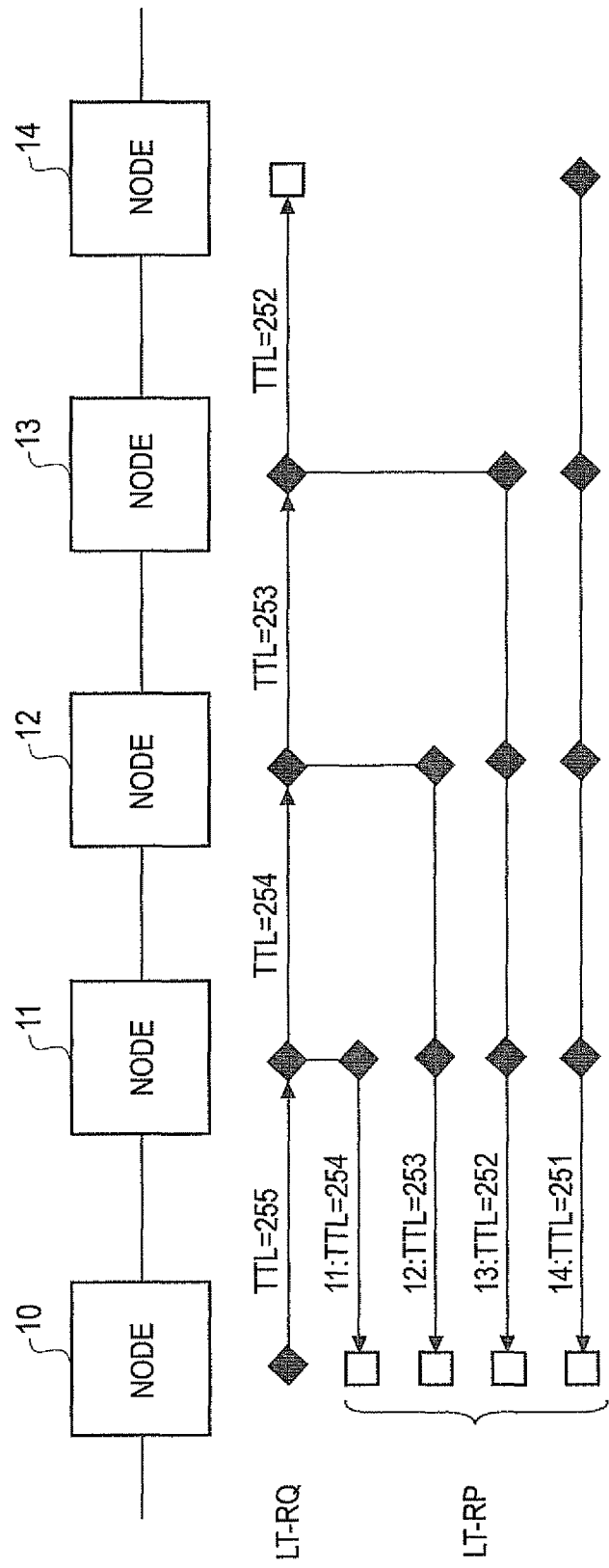
FIG. 1 An explanatory diagram as to a procedure of acquiring routing information with the use of an LT technique.
Figure 2:
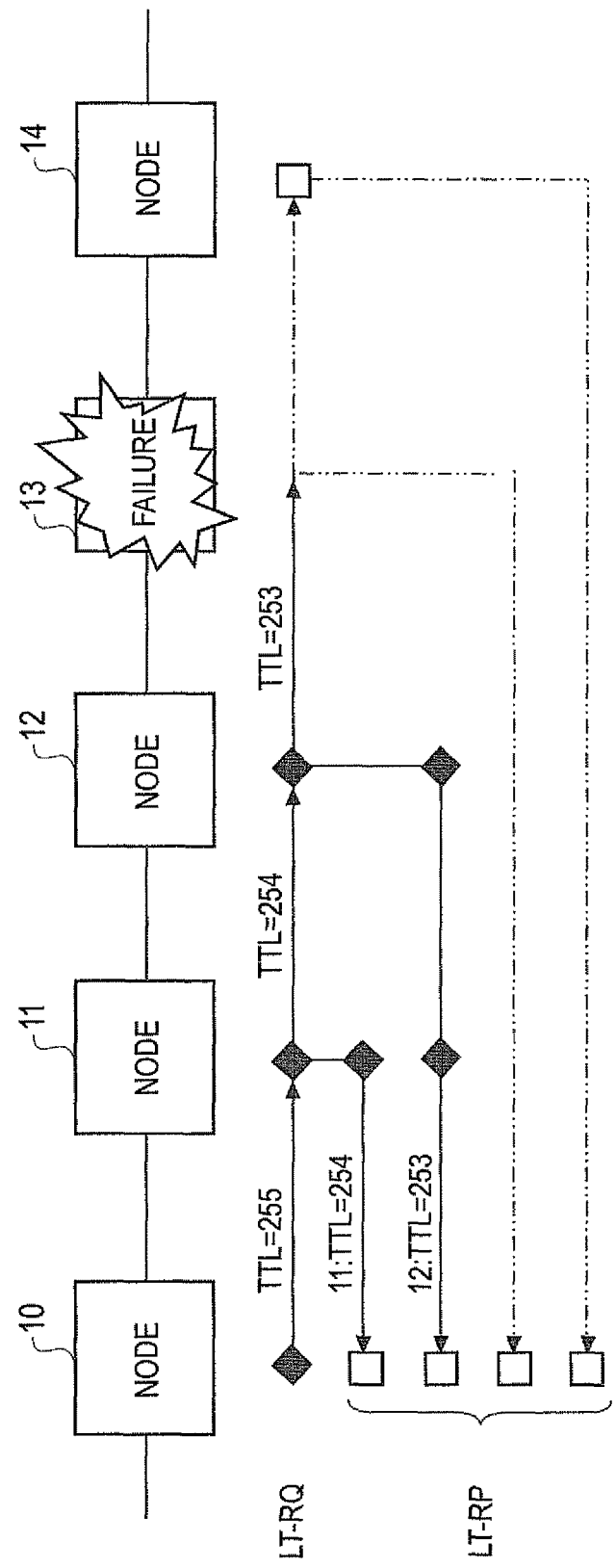
FIG. 2 An explanatory diagram as to a procedure of acquiring routing information with the use of an LT technique.

Hereinafter, exemplary embodiments of the present invention will be described in detail with reference to the accompanying drawings.

First Embodiment

According to the present embodiment, in order to transmit inspection and response signals of the present invention, the LT technique of the above ITU-T recommendation Y.1731 is used.

The outline of the present embodiment will be described with reference to FIGS. 3 and 4. A node 100 corresponds to a reference node, and a node 104 to a turn node. Moreover, in a network shown in the diagram, a route leading from the node 100 to a node 101, from the node 101 to a node 102, from the node 102 to a node 103, and from the node 103 to the node 104 (Node 100→Node 101→Node 102→Node 103→Node 104) corresponds to a forward path, and an opposite-direction route to a return path. Suppose that the forward and return paths are set up in advance.

In each of the nodes 100 to 104, the following buffers are provided: a priority buffer 840, in which frames that should be transmitted in a priority class to the forward path are queued; a non-priority buffer 841, in which frames that are transmitted in a non-priority class to the forward path are queued; a priority buffer 842, in which frames that are transmitted in a priority class to the return path are queued; and a non-priority buffer 843, in which frames that are transmitted in a non-priority class to the return path are queued. In the buffers 840 to 843, Ethernet (Registered Trademark) frames, including OAM frames such as LT-RQ and LT-RP, are stored depending on communication directions (forward/return path) or priority. Incidentally, an LT-RQ corresponds to an inspection signal, and an LT-RP to a response signal.

Figure 3:
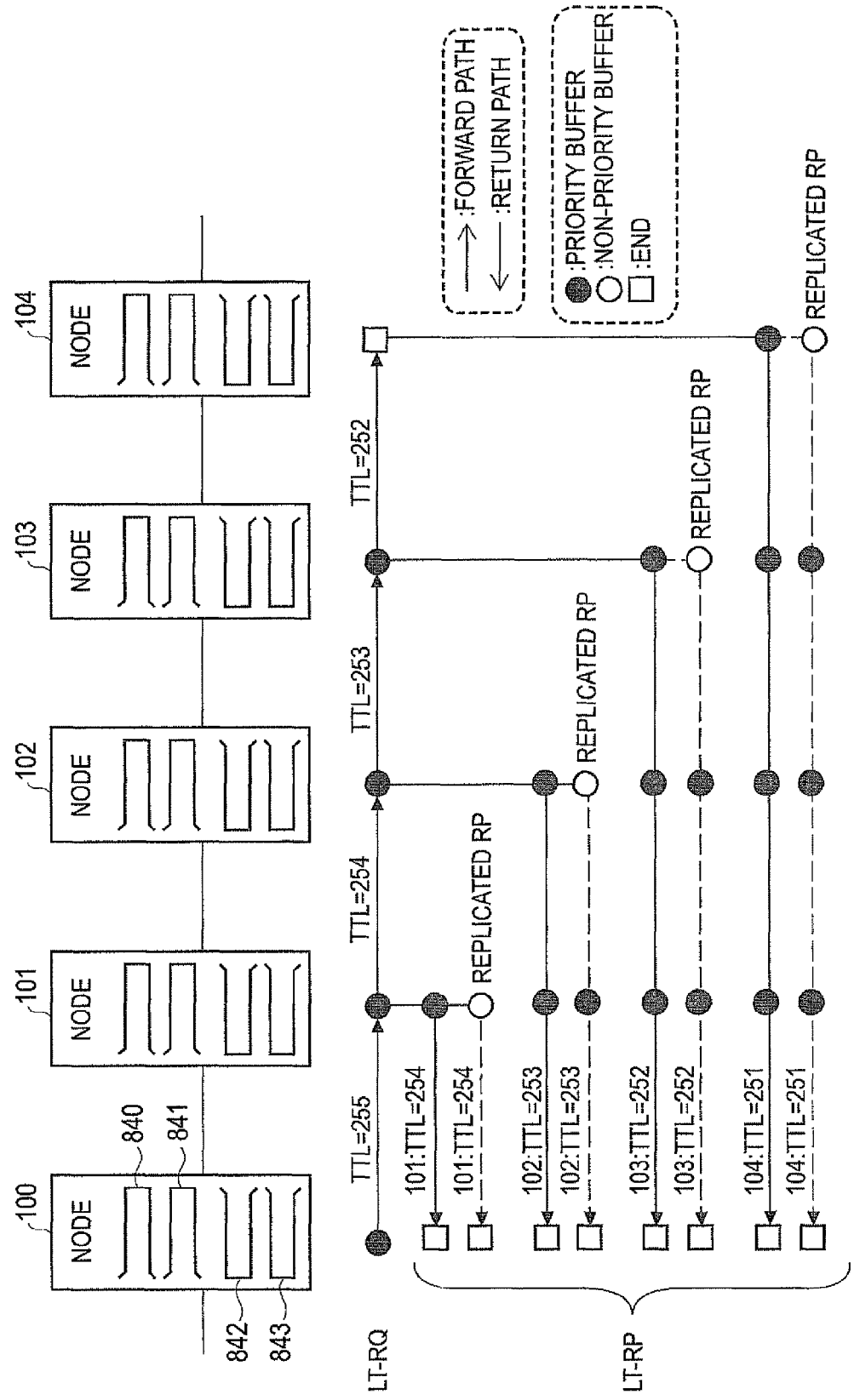
FIG. 3 An explanatory diagram as to congestion detection of return-path communication according to a first embodiment of the present invention.
Figure 4:
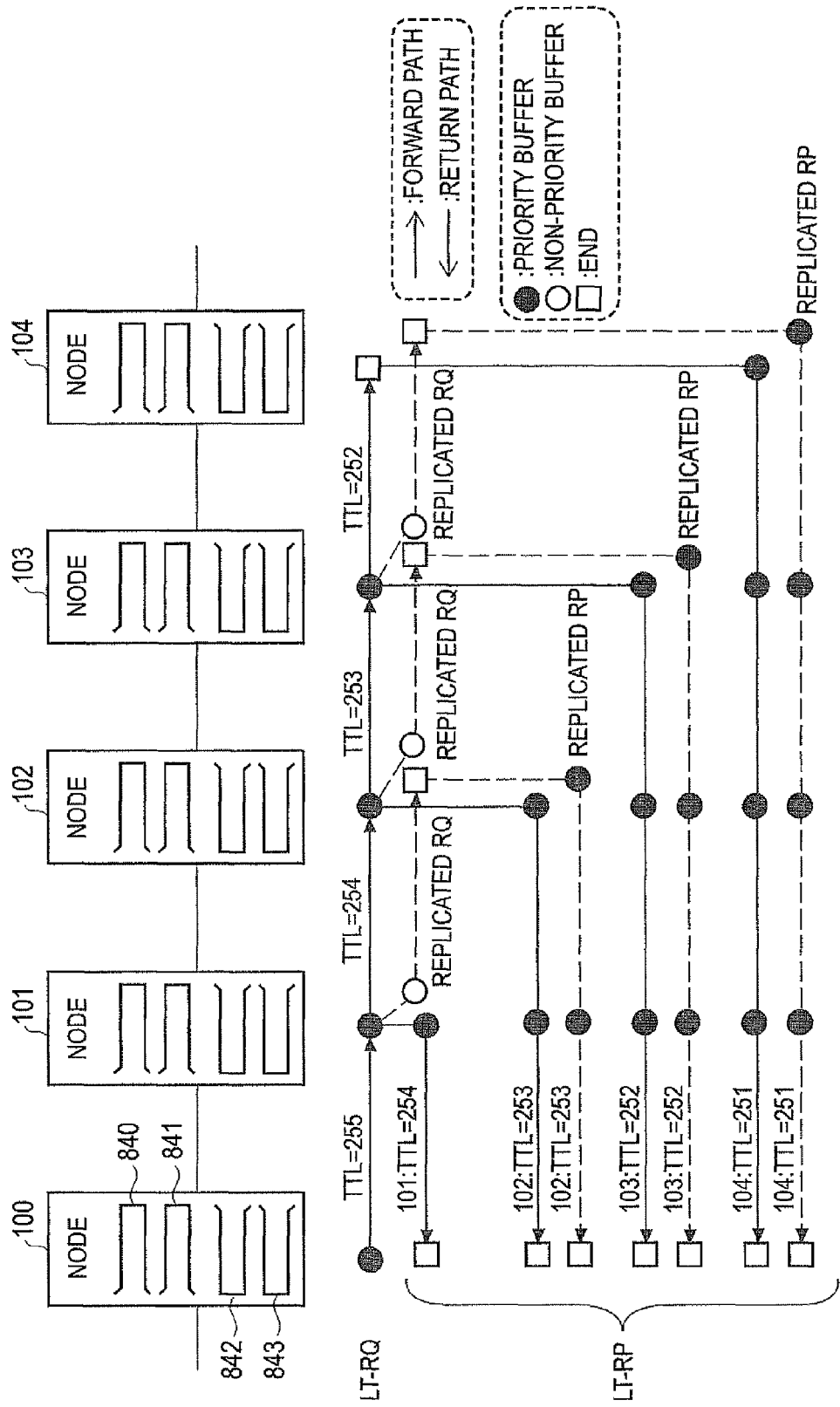
FIG. 4 An explanatory diagram as to congestion detection of forward-path communication according to the first embodiment of the present invention FIG. 5 A format of an OAM frame.

The lower section of FIG. 3 shows an operation of detecting a congested node in return-path communication. The lower section of FIG. 4 shows an operation of detecting a congested node in forward-path communication. A node that congestion occurs in forward-path or return-path communication indicates a node whose non-priority-class transmission queue for forward-path or return-path communication is congested. From the beginning, a priority-class transmission queue is rarely congested in any node. According to the present embodiment, an inspection of a non-priority-class transmission queue, which can be easily congested in each node, is carried out to detect a node that congestion occurs.

According to the present embodiment, each node generates a replica frame of LT-RP or LT-RQ, and transmits the replica frame from a non-priority buffer corresponding to a to-be-inspected route (forward/return path). For example, when the return path is inspected, as shown in FIG. 3, an LT-RP is transmitted from a priority buffer of the return path, and a replica of LT-RP is transmitted from a non-priority buffer of the same return path. When the forward-path communication is inspected, as shown in FIG. 4, a replica of LT-RQ is transmitted, at a time when an LT-RQ is transferred from a priority buffer of the forward path, from a non-priority buffer of the same forward path.

In that manner, a sequence of processes for receiving a replica frame of LT-RP after an LT-RQ is transmitted from the reference node 100 is different from a sequence of processes for receiving an LT-RP after an LT-RQ is transmitted in that a non-priority buffer is used in a node that generates the replica. As described above, compared with a priority-class transmission queue, a non-priority-class transmission queue can be more easily congested. A delay time emerges since a non-priority buffer is congested; a difference in arrival time between the received LT-RP and the received replica frame of LT-RP occurs. With attention focused on the arrival-time difference, a node that congestion occurs is identified.

Figure 5:
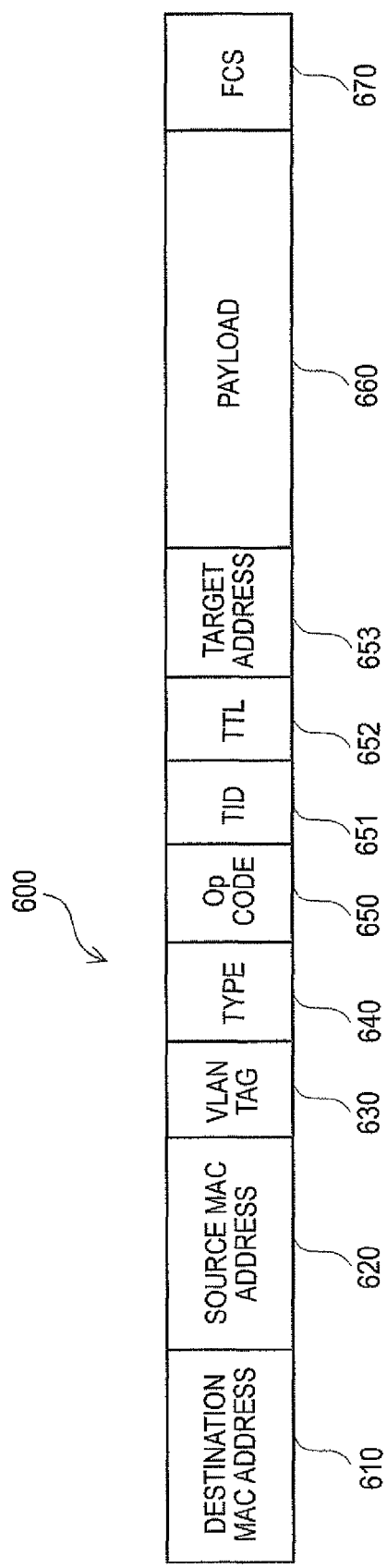

The configuration of each of the nodes 100 to 104, which are used to realize the above operation, will be described. FIG. 5 shows a format of the OAM frame that each node handles. The format is applied to an LT-RQ and LT-RP. As in a typical frame, an OAM frame 600 includes a destination MAC address 610, a source MAC address 620, a VLAN tag 630, Type 640, a payload 660, and FCS 670. In the OAM frame 660, OpCode 650, Transaction Identifier (TID) 651, TTL 652, and a target address 653 are inserted between the Type 640 and the payload 660.

As a unique value of the OAM frame, a Type value exclusively for OAM is stored in the Type 640. In the OpCode 650, a value representing a function of the OAM frame is stored. In the TID 651, an execution ID of OAM control is stored. In the TTL 652, a TTL value is stored. In the target address 653, an address of a target node (termination node) of OAM control is stored.

Figure 6:
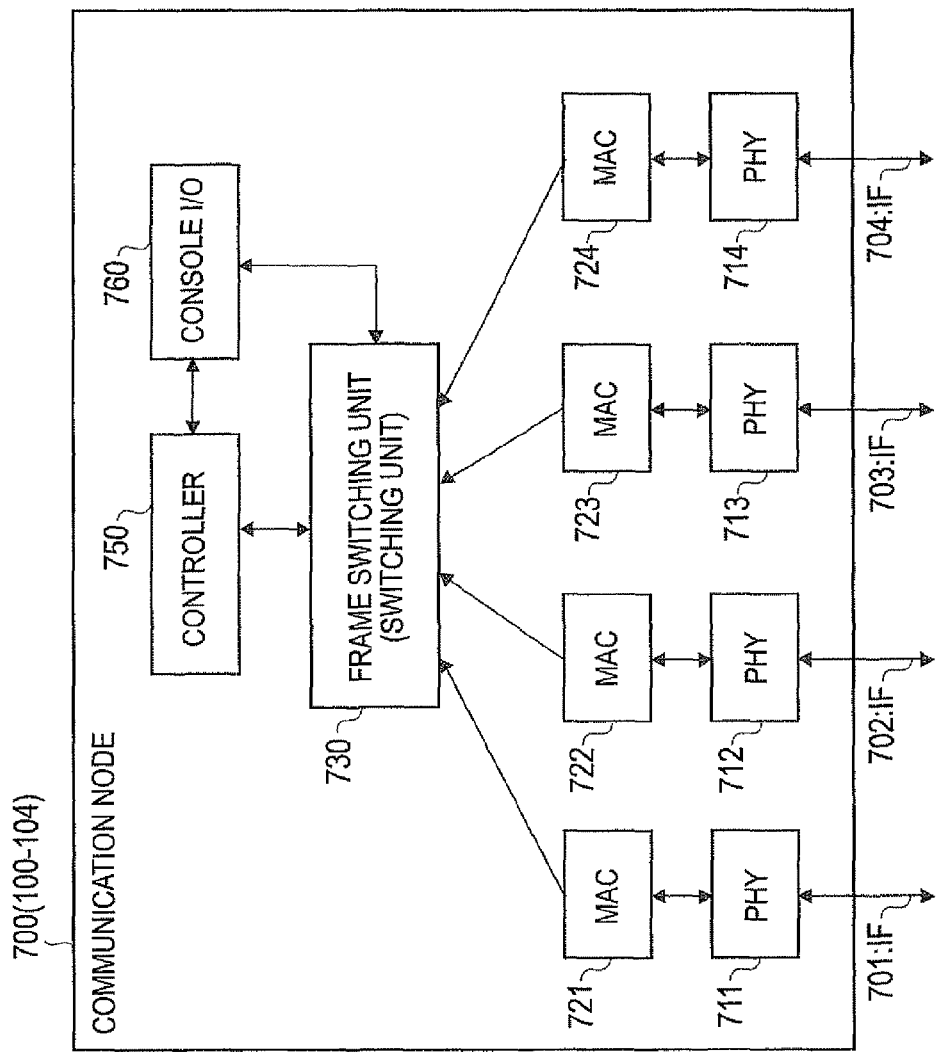
FIG. 6 A block diagram of each node according to the first embodiment of the present invention.

FIG. 6 shows the configuration of a communication node 700. The communication node 700 corresponds to each of the nodes 100 to 104 shown in FIGS. 3 and 4. The communication node 700 includes PHY 711, 712, 713 and 714, which are physical-layer communication means for communicating with other communication nodes; MAC 721, 722, 723 and 724, which are MAC-layer communication means; a frame switching unit 730; a controller 750; and a console I/O 760. The frame switching unit 730 corresponds to a switching unit of a communication node.

Frames input from communication interfaces IF 701 to 704 are input to the frame switching unit 630 via PHY 711 to 714 and MAC 721 to 724. The frame switching unit 630 determines an appropriate output IF through an operation described below, and outputs a frame to IF 701 to 704 via MAC 721 to 724 and PHY 711 to 714.

The controller 750 supplies a control instruction to the frame switching unit 730. The console I/O 760 supplies an input from an operator associated with OAM control to the frame switching unit 730 and the controller 750, and outputs a result of OAM control associated with congestion detection. The controller 750 may be replaced with a CPU and a memory. The memory stores a program, which is used to control an operation of the frame switching unit 730, and necessary data. The CPU executes the program using the data in the memory to supply, as in the controller 750, a control instruction to the frame switching unit 730.

Figure 7:
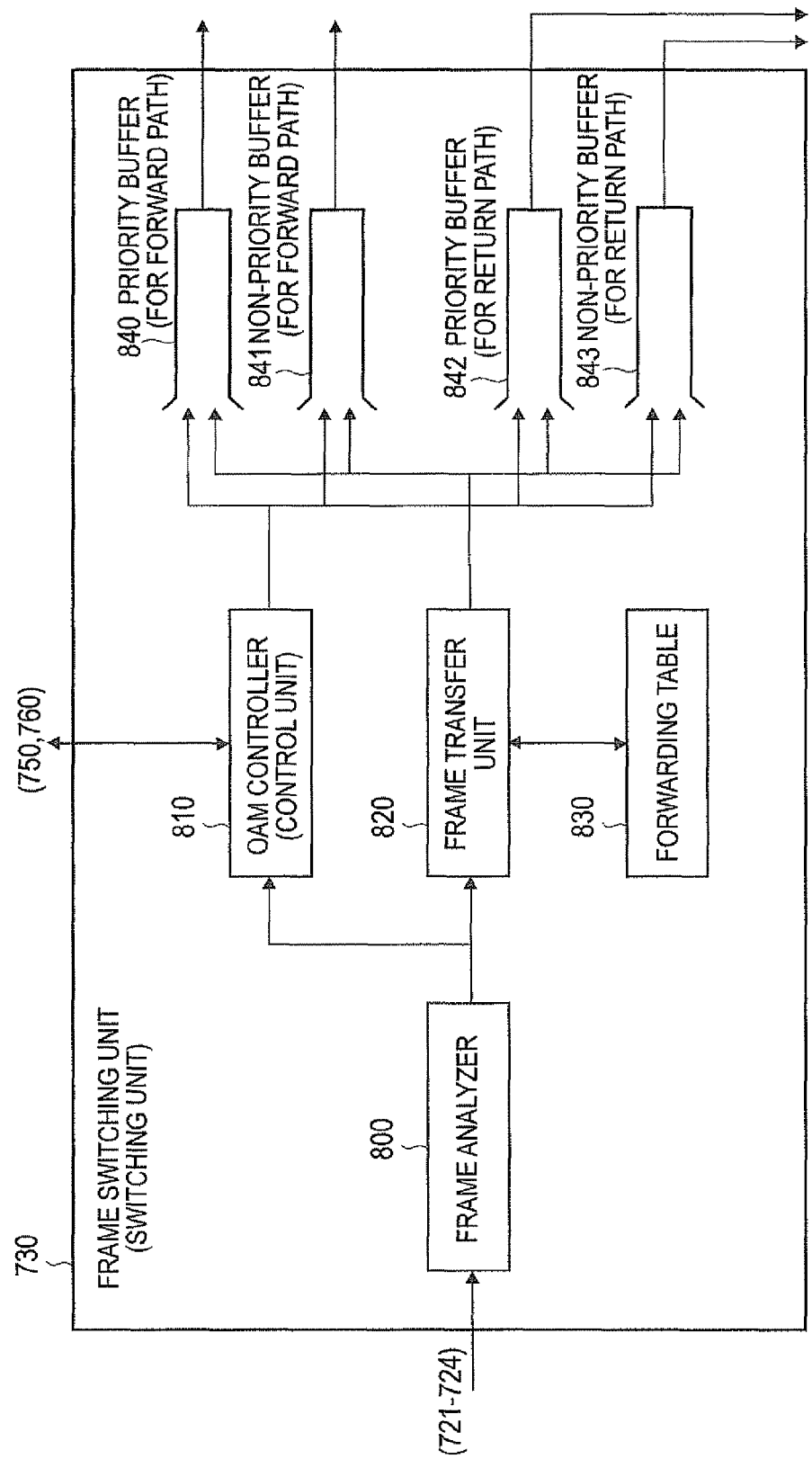
FIG. 7 A block diagram of a frame switching unit according to the first embodiment of the present invention.

FIG. 7 shows the configuration of the above frame switching unit 730. As described above, in a priority buffer (for forward path) 840 and a priority buffer (return path) 842, frames, which are to be transmitted in a priority class, are queued. In a non-priority buffer (for forward path) 841 and a non-priority buffer (for return path) 843, non-priority-class frames are queued.

Based on a value of the Type field 510 (FIG. 5) of a frame input from MAC 721 to 724, a frame analyzer 800 makes a determination as to whether the frame is an OAM frame. When the frame is an OAM frame 600, the frame is transferred to an OAM controller 810. When the frame is another frame, the frame is transferred to a frame transfer unit 820.

What is stored in a forwarding table 830 is information about output ports for MAC addresses/VLAN tags.

After receiving a main signal data frame from the frame analyzer 800, the frame transfer unit 820 checks the forwarding table 830. Depending on the priority of the output port information acquired from the table, the frame transfer unit 820 adds an OAM frame to the queues of the corresponding buffer 840, 841, 842 or 843.

The OAM controller 810 corresponds to a control unit of a communication node. The OAM controller 810 performs a required process in response to the contents of an OAM frame from the frame analyzer 800. The OAM controller 810 then determines an output port by checking a table, which is stored in the OAM controller 810, and adds an OAM frame to the queues of the corresponding buffer 840, 841, 842 or 843. When receiving an instruction associated with OAM control from the console I/O 760, the OAM controller 810 generates and outputs a corresponding OAM frame, and supplies a result of the executed OAM control (a result of congestion detection or the like) to the console I/O 760.

Figure 8:
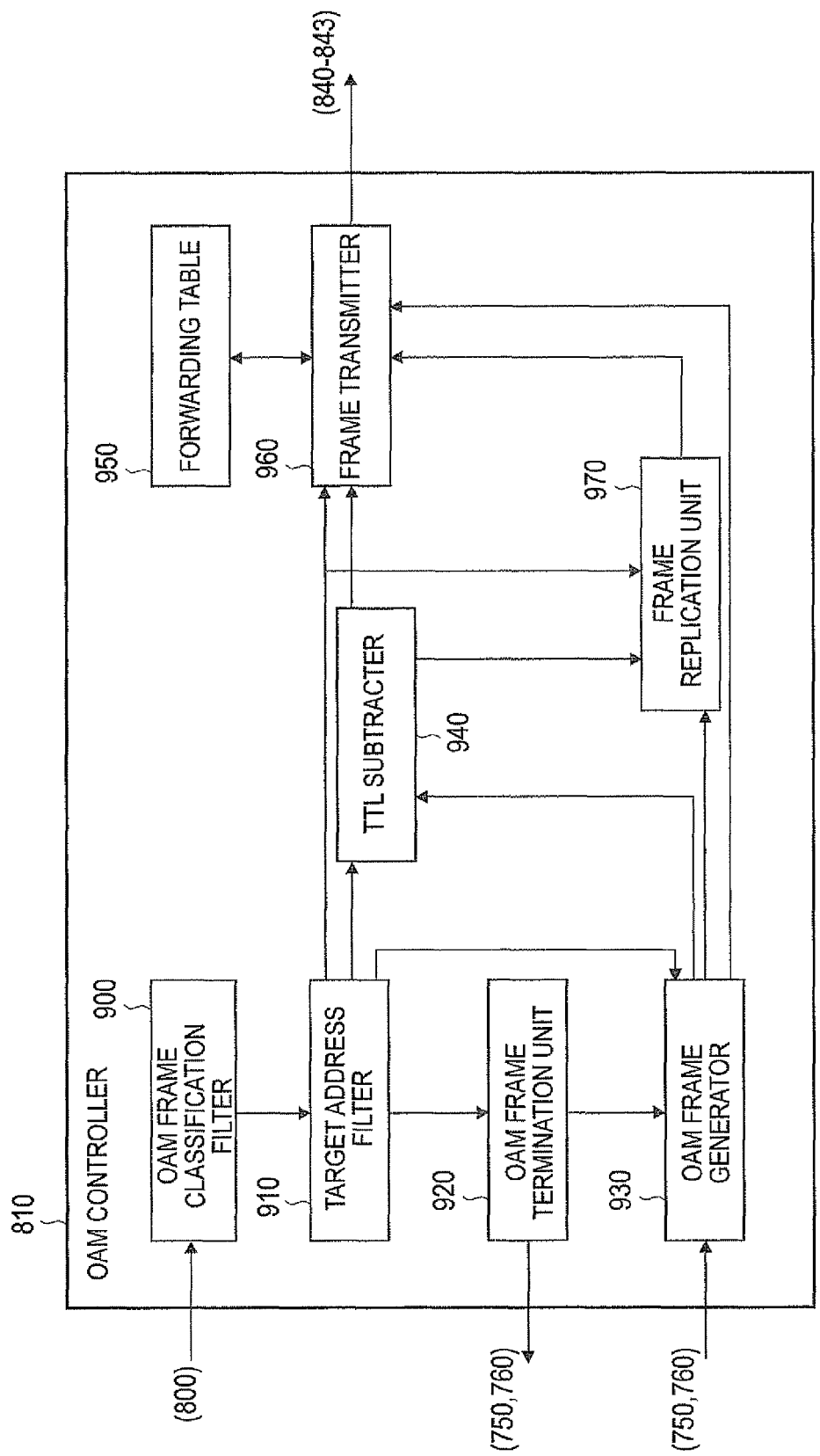
FIG. 8 A block diagram of an OAM controller according to the first embodiment of the present invention.

FIG. 8 shows the configuration of the above OAM controller 810. An OAM frame classification filter 900 determines the type of an OAM frame received from the frame analyzer 800 on the basis of the OpCode 650 (FIG. 5) of the OAM frame, and notifies a target address filter 910 of a result of the determination.

The target address filter 910 sorts OAM frames received from the OAM frame classification filter 900 into portions according to the OAM frame types and target addresses.

More specifically, as for an LT-RQ, if the target is the local node, i.e. if the local node is the turn node 104, the target address filter 910 transfers the LT-RQ to an OAM frame termination unit 920. If the target is another node, the target address filter 910 transfers the LT-RQ to a TTL subtracter 940, and instructs a OAM frame generator 930 to generate an LT-RP. As for an LT-RQ replica frame, if the target is the local node, the target address filter 910 transfers the replica frame to the OAM frame termination unit 920. If the target is another node, the target address filter 910 instructs the OAM frame generator 930 to generate an LT-RP replica frame. As for the LT-RP and the replica frame thereof, if the target is the local node, i.e. if the local node is the reference node 100, the target address filter 910 transfers the frames to the OAM frame termination unit 920. If the target is another node, the target address filter 910 transfers the frames to a frame transmitter 960.

The OAM frame termination unit 920 terminates the transferred LT-RQ or the replica frame thereof, and instructs the OAM frame generator 930 to generate an LT-RP or a replica frame thereof. If the LT-RP or the replica frame thereof is transferred to the OAM frame termination unit 920, the OAM frame termination unit 920 performs, as a typical LT-RP termination function, a process of acquiring connection-related information by rearranging TTL values, and makes a congestion determination. A result of the determination is supplied to the console I/O 760.

After receiving an instruction associated with LT control from the console I/O 760, the OAM frame generator 930 generates an LT-RQ targeted at the specified turn node 104. When being instructed by the target address filter 910 or the OAM frame termination unit 920 to generate an LT-RP or a replica frame thereof, the OAM frame generator 930 generates the LT-RP or the replica frame thereof targeted at the specified reference node 100. The generated LT-RQ is transferred to the frame transmitter 960; the LT-RP and the replica frame thereof are transferred to the TTL subtracter 940.

The TTL subtracter 940 subtracts "1" from a TTL value of the LT-RQ, which is received from the target address filter 910, and from a TTL value of the LT-RP, which is received from the OAM frame generator 930, or of the replica frame thereof. During a return-path congestion inspection process, the LT-RP, which is obtained by the TTL subtraction, is transferred to the frame transmitter 960. During a forward-path congestion inspection process, the LT-RP, which is obtained by the TTL subtraction, is transferred to a frame replication unit 970.

What is stored in a forwarding table 950 is information about output ports for target addresses.

After receiving the LT-RQ, LT-RP, LT-RQ replica frame or LT-RP replica frame, the frame transmitter 960 acquires from the forwarding table 950 an output port corresponding to an address of the destination MAC address 610 or target address 653, and supplies the frame to the output port.

As for the LT-RQ and LT-RP from the TTL subtracter 940, the frame replication unit 970 generates replica frames of the LT-RQ and LT-RP, and transfers the replica frames to the frame transmitter 960.

Figure 9:
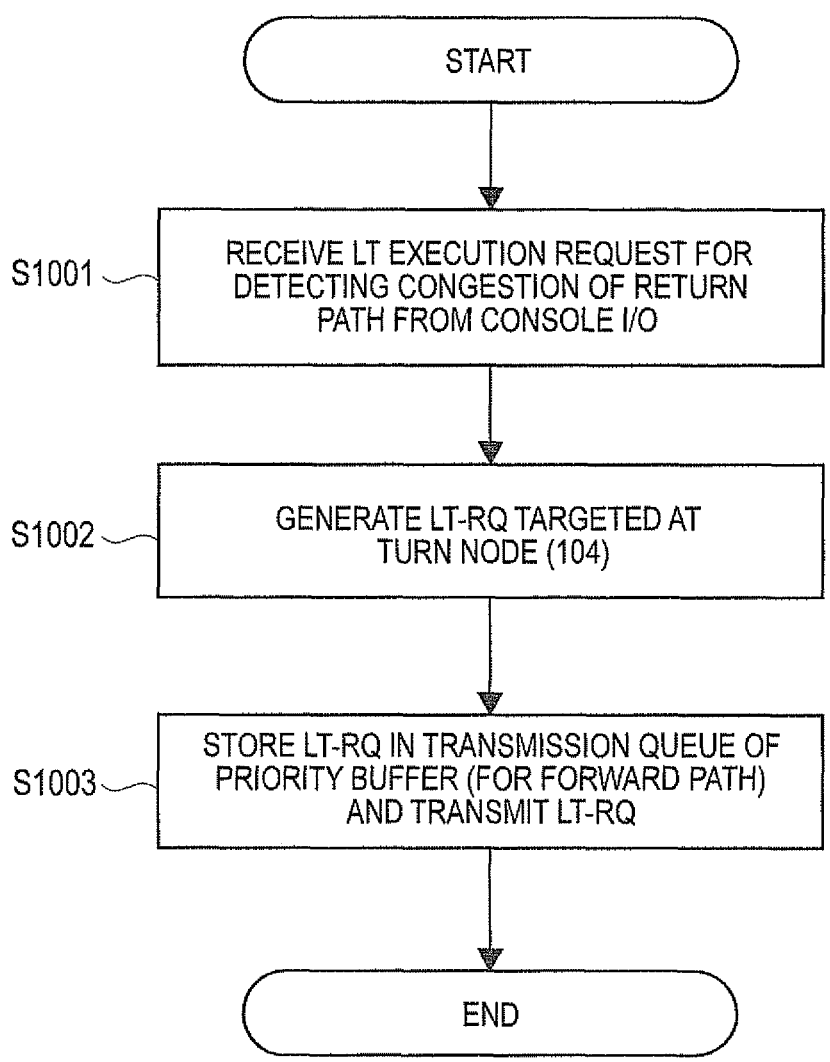
FIG. 9 A flowchart as to LT-RQ transmission according to the first embodiment of the present invention.
Figure 10:
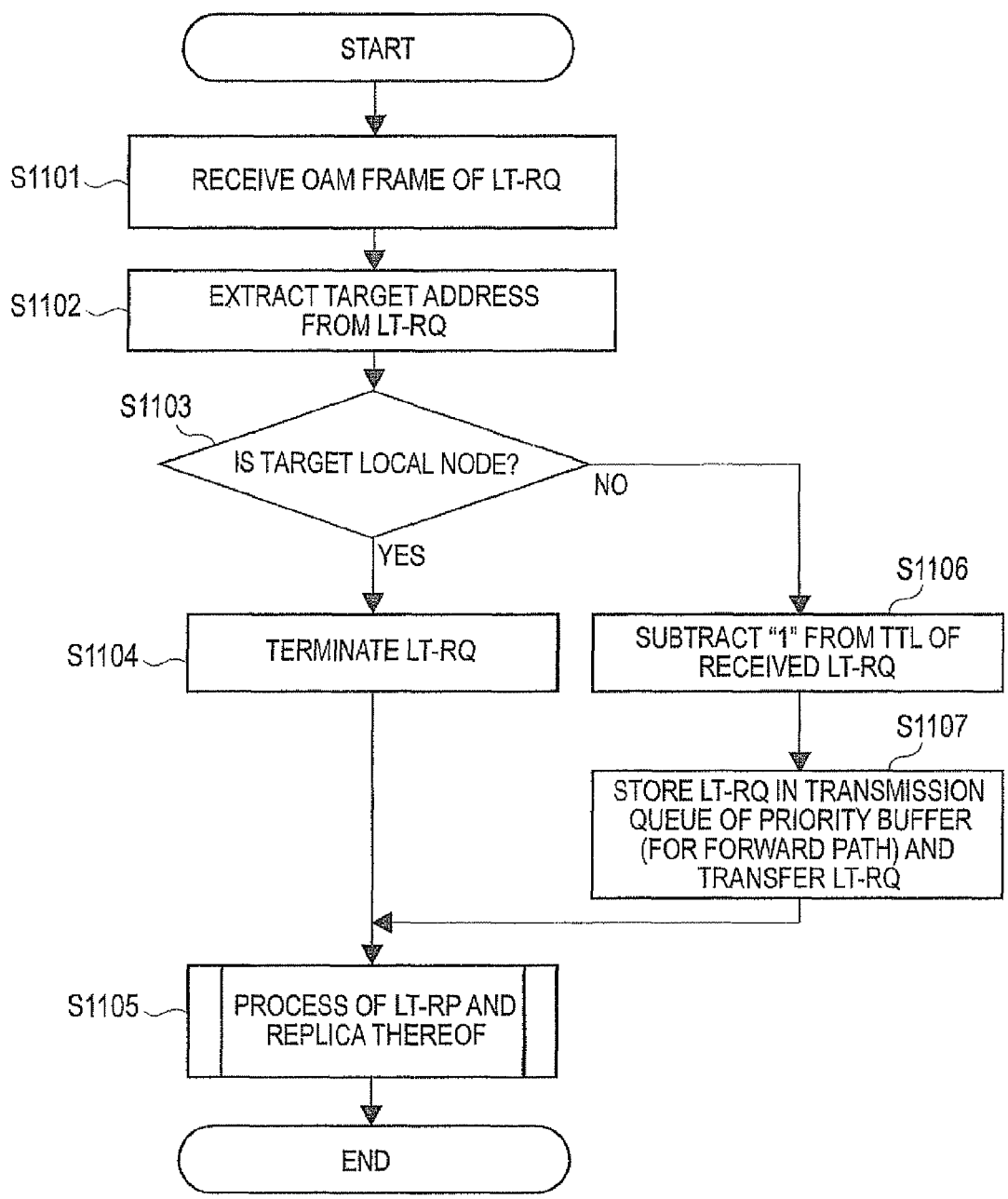
FIG. 10 A flowchart as to LT-RQ reception at a time when a return path is inspected according to the first embodiment of the present invention.
Figure 11:
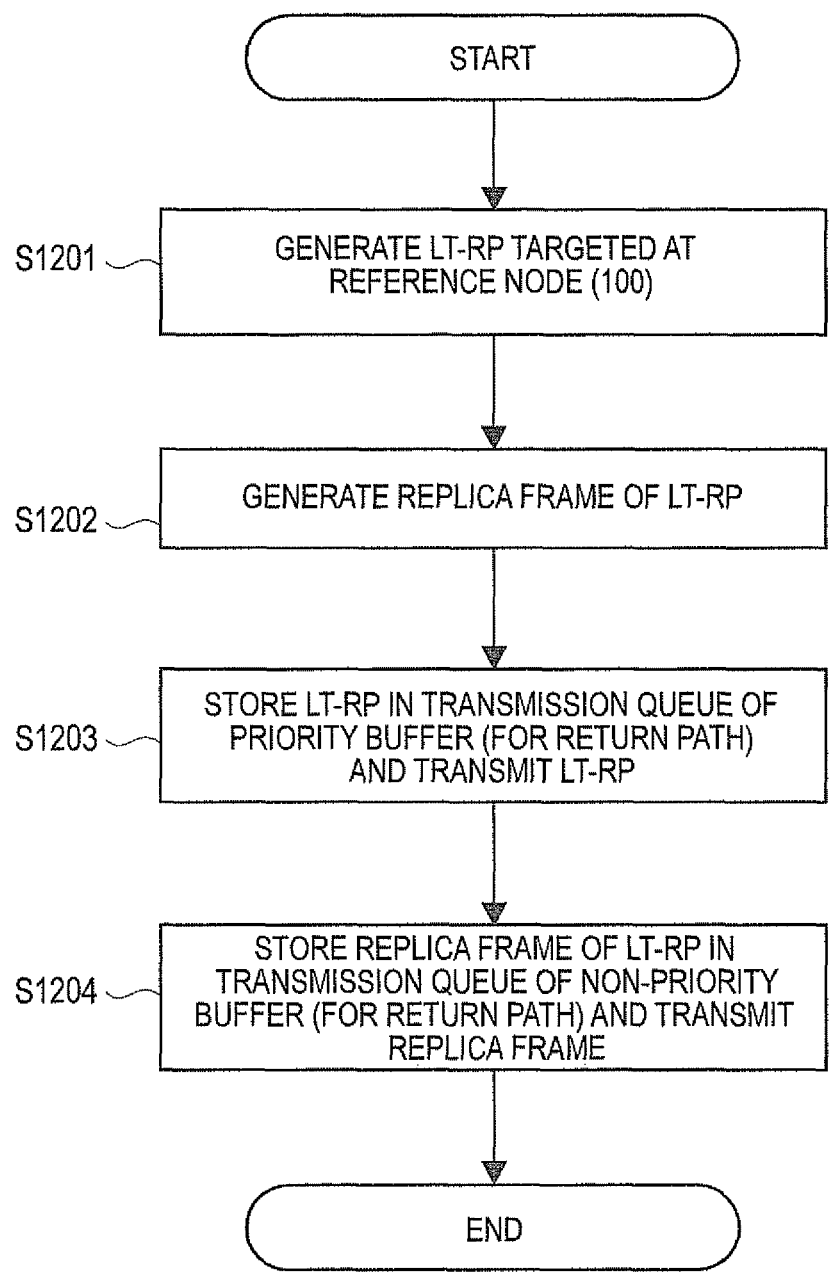
FIG. 11 A flowchart as to LT-RP transmission at a time when a return path is inspected according to the first embodiment of the present invention.
Figure 12:
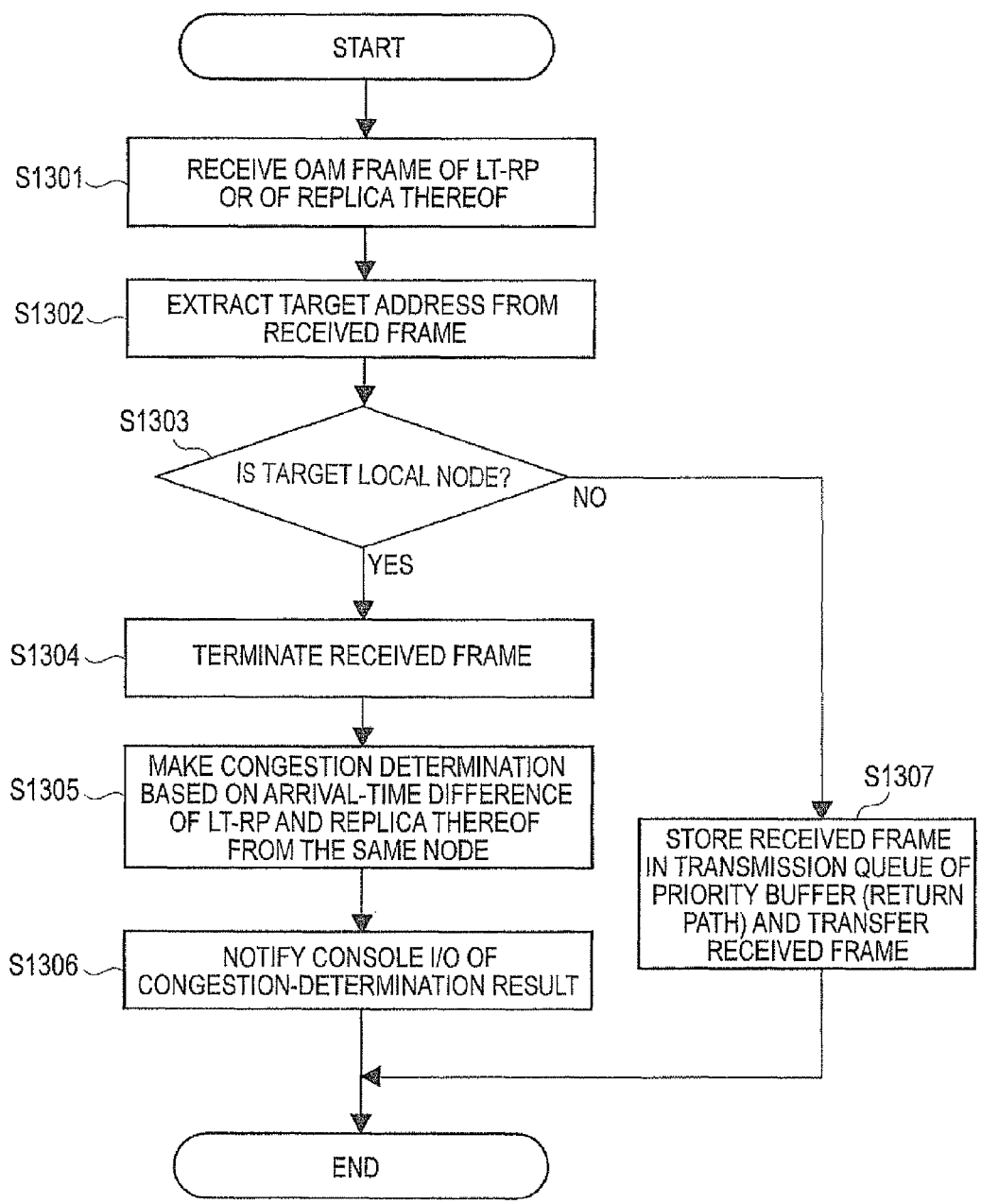
FIG. 12 A flowchart as to LT-RP reception according to the first embodiment of the present invention.

With reference to flowcharts shown in FIGS. 9 to 12, an operation of each node associated with return-path congestion detection (FIG. 3) will be described. FIG. 9 is an operational flowchart as to transmission of an LT-RQ by the reference node 100. FIG. 10 is an operational flowchart as to reception of an LT-RQ by the relay nodes 101 to 103 and the turn node 104. FIG. 11 is an operational flow as to transmission of an LT-RP by the relay nodes 101 to 103 and the turn node 104. FIG. 12 is an operational flowchart as to reception of an LT-RP by the reference node 100 and the relay nodes 101 to 103.

As shown in FIG. 9, the OAM frame generator 930 of the reference node 100 receives an LT execution request, which is aimed at detecting congestion of the return path, from the console I/O 760 (Step S1001). The LT execution request includes address information associated with the turn node (104). The address of the turn node becomes a target address of an LT-RQ. The OAM frame generator 930 generates an LT-RQ, and transfers the LT-RQ to the frame transmitter 960 (Step S1002).

The frame transmitter 960 acquires from the forwarding table 950 the output port information associated with the target address of the LT-RQ from the OAM frame generator 930. The frame transmitter 960 queues the LT-RQ in the priority buffer (for forward path) 840 of a corresponding output port, thereby transmitting the LT-RQ to the forward path (Step S1003).

As shown in FIG. 10, the relay nodes 101 to 103 and the turn node 104 receive the LT-RQ transmitted from the reference node 100 (Step S1101). The OAM frame classification filter 900 extracts a target address from the LT-RQ, and notifies the target address filter 910 of the target address (Step S1102). The target address filter 910 makes a determination as to whether the target address of the LT-RQ is that of the local node (Step S1103).

When the target of the LT-RQ is the local node, i.e. when the local node is the turn node 104, the target address filter 910 notifies the OAM frame termination unit 920 of the fact that the local node is the turn node 104. As a result, a termination process is performed on the LT-RQ (Step S1104). Moreover, the target address filter 910 instructs the OAM frame generator 930 to generate an LT-RP. As a result, a process described below of LT-RP transmission is performed (Step S1105).

Meanwhile, when the target of the received LT-RQ is another node (Step S1103: No), i.e. when the local node is one of the relay nodes 101 to 103, the target address filter 910 transfers the received LT-RQ to the TTL subtracter 940. The TTL subtracter 940 subtracts "1" from a TTL value of the transferred LT-RQ (Step S1106). As for the LT-RQ having the TTL value from which "1" is subtracted, the frame transmitter 960 acquires from the forwarding table 950 the output port information for the target address 104. The frame transmitter 960 then queues the above LT-RQ in the priority buffer (for forward path) 840 of the corresponding output port, and transfers the LT-RQ to the next hop (Step S1107).

Moreover, the relay nodes 101 to 103 proceed to a process of transmitting an LT-RP for the received LT-RQ (Step S1105).

With reference to FIG. 11, a procedure of the process (S1105) associated with the LT-RP by the relay nodes 101 to 103 and the turn node 104 will be described.

After being instructed by the OAM frame termination unit 920 or target address filter 910 to generate an LT-RP, the OAM frame generator 930 generates an LT-RP using address information (the address of the reference node 100), which is specified as a target address (Step S1201). The OAM frame generator 930 then transfers the generated LT-RP to the TTL subtracter 940. The TTL subtracter 940 subtracts "1" from a TTL value of the transferred LT-RP, and transfers the LT-RP to the frame transmitter 960 and the frame replication unit 970.

The frame replication unit 970 generates a replica frame of the LT-RP, and transfers the replica frame to the frame transmitter 960 (Step S1202).

As for the LT-RP from the TTL subtracter 940, the frame transmitter 960 checks the forwarding table 950 to acquire the output port information. Then, the frame transmitter 960 queues the LT-RP in the priority buffer (for return path) 842 of a corresponding output port to transmit the LT-RP (Step S1203).

As for the LT-RP replica frame from the frame replication unit 970, the frame transmitter 960 checks the forwarding table 950 to acquire the output port information. The frame transmitter 960 then queues the LT-RP replica frame in the non-priority buffer (for return path) 843 of a corresponding output port to transmit the LT-RP replica frame (S1204).

As shown in FIG. 12, after receiving the LT-RP or replica frame thereof on the return path (Step S1301), the reference node 100 and the relay nodes 101 to 103 extract a target address from the received frame (Step S1302). The target address filter 910 makes a determination as to whether the target address is that of the local node (Step S1303).

When the target of the LT-RP or replica thereof is the local node, i.e. when the local node is the reference node 100, the OAM frame termination unit 920 performs a process of terminating the LT-RP or replica thereof (Step S1304).

The OAM frame termination unit 920 makes a determination as to whether the node is congested on the basis of the difference in arrival time between the LT-RP and the replica frame thereof, which are transmitted from the same node (Step S1305). To make the above determination, the OAM frame termination unit 920 uses the source information and TTL value, which are written into the received frame, to recognize a combination of the LT-RP and the replica frame thereof, which are transmitted from the same node. Then, the OAM frame termination unit 920 calculates the arrival-time difference of each of the recognized combinations. If the difference exceeds a predetermined threshold value, the OAM frame termination unit 920 determines that the target node has been congested in return-path communication. The console I/O 760 is notified of the congestion-determination result (Step S1306).

When the target of the received LT-RP or replica thereof is another node (Step S1303: No), i.e. when the local node is one of the relay nodes 101 to 103, the frame transmitter 960 checks the forwarding table 950 to acquire the output port information for the target (100). Then, the frame transmitter 960 queues the received LT-RP or replica thereof in the priority buffer (for return path) 842 of a corresponding output port to transfer the received LT-RP or replica thereof to the next hop (Step S1307).

Specific Example 1-1

The following describes a specific example of how to detect congestion in the above return-path communication. In the example below, as for the time needed to pass through each priority/non-priority buffer, the time for the case where no buffer is congested is represented by T, and the time for the case where a buffer is congested is represented by 10T. In addition, a threshold value that is used in the reference node 100 to make a congestion determination is represented by 3T.

Figure 13:
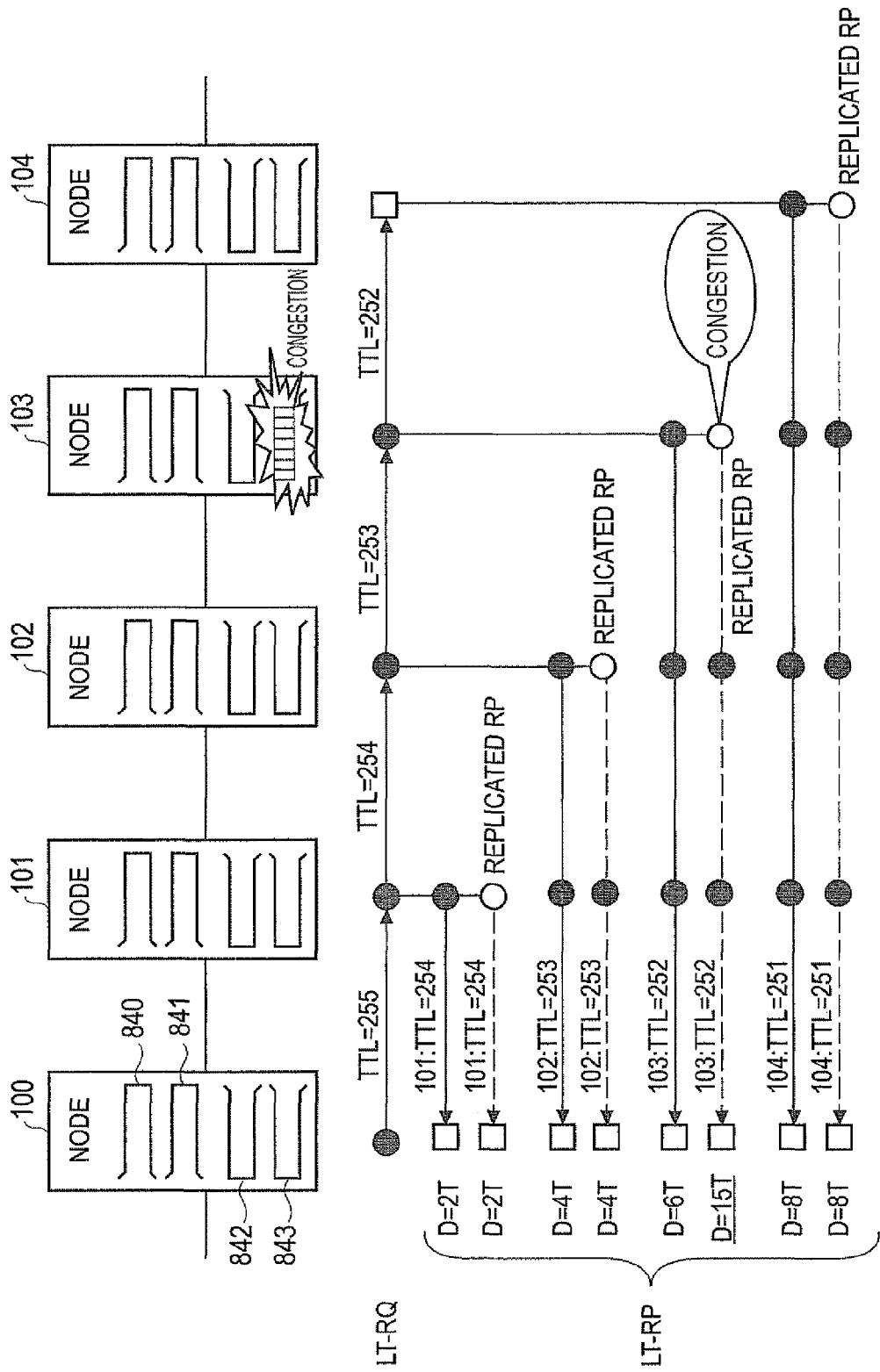
FIG. 13 An explanatory diagram as to a specific example of return-path inspection according to the first embodiment of the present invention.

FIG. 13 shows a specific example of congestion detection (FIG. 3) in return-path communication. In the present example, suppose that the non-priority buffer (for return path) 843 of the node 103 is congested.

In the case of the node 101, T is required for transmission of an LT-RQ in the reference node 100; T is required for transmission of an LT-RP in the node 101, as well as for transmission of a replica frame thereof. In this case, the arrival time needed for the LT-RP to arrive at the reference node 100 from the node 101 is D=2T. Similarly, the arrival time of the replica frame thereof is D=2T. Therefore, there is no difference in arrival time. Accordingly, the node 100 determines that the node 101 is not congested.

Similarly, in the case of the node 102, the arrival time of the LT-RP is D=4T. The arrival time of the replica frame thereof is similarly D=4T. Therefore, there is no difference in arrival time. In the case of the node 104, the arrival time of the LT-RP is D=8T. The arrival time of the replica frame thereof is similarly D=8T. Therefore, there is no difference in arrival time. Accordingly, the reference node 100 determines that the nodes 102 and 104 are not congested.

However, in the node 103, the non-priority buffer (for return path) 843 is congested. In the case of the node 103, while the arrival time of the LT-RP is D=6T, the arrival time of the LT-RP replica frame, which uses the congested non-priority buffer (for return path) 843, is D=15T (T+T+T+10T+ T+T=15T). Since the arrival-time difference 9T exceeds the threshold value 3T, the reference node 100 determines that the node 103 has been congested in return-path communication.

Figure 14:
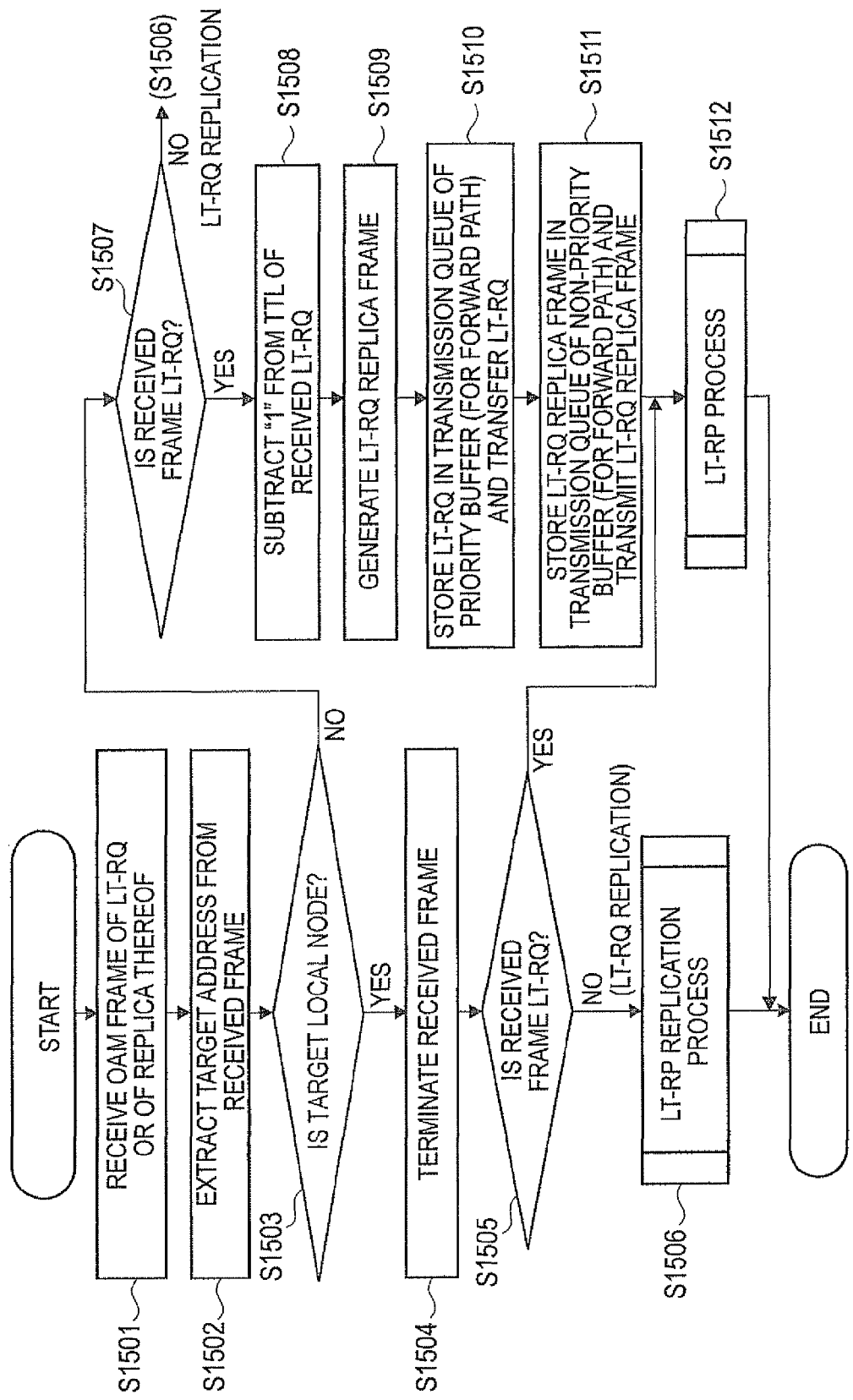
FIG. 14 A flowchart as to LT-RQ reception at a time when a forward path is inspected according to the first embodiment of the present invention.
Figure 15:
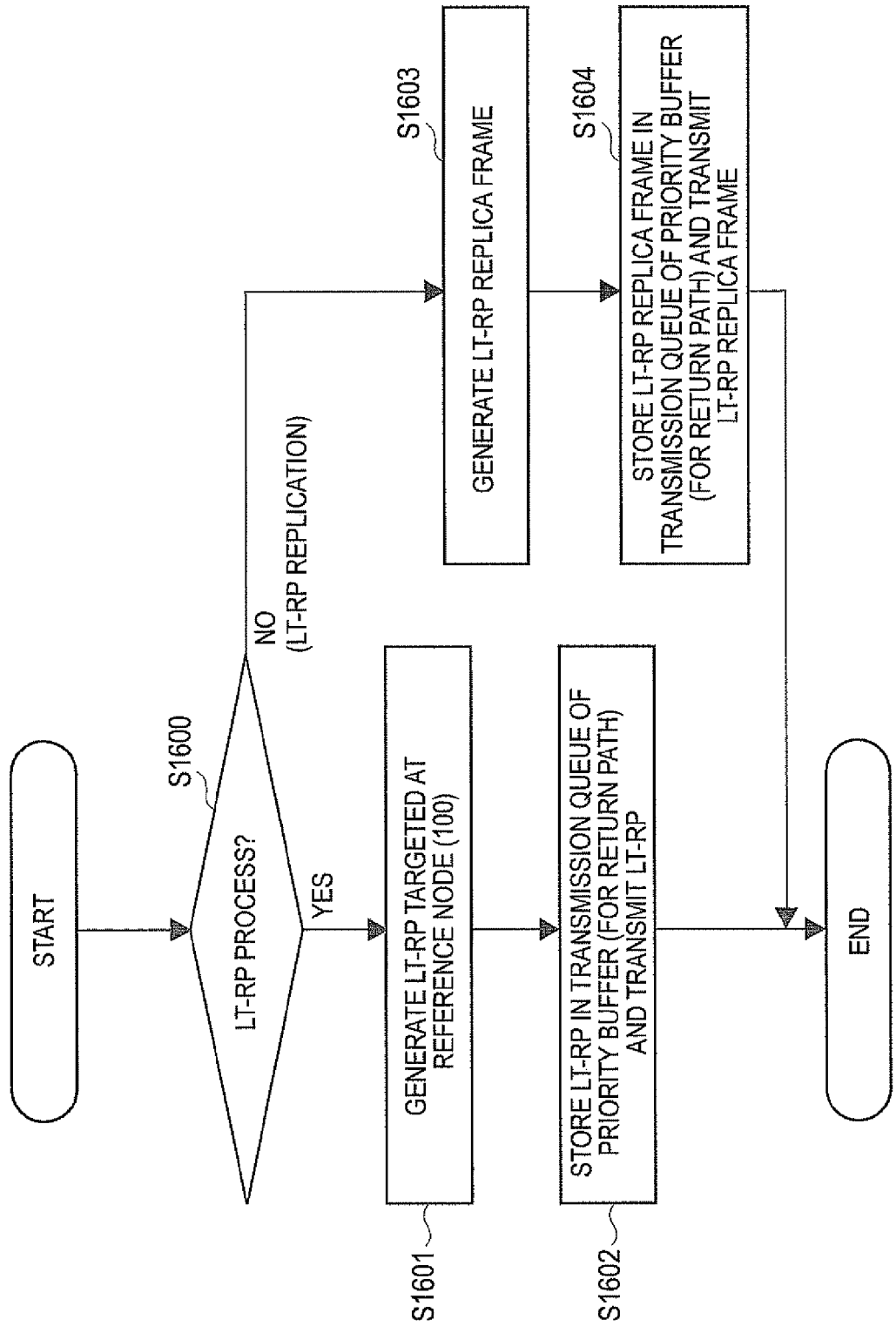
FIG. 15 A flowchart as to LT-RP transmission at a time when a forward path is inspected according to the first embodiment of the present invention.

The following describes an operation of each node as to congestion detection (FIG. 4) of the forward path according to the present embodiment. FIG. 14 shows an operational flowchart at a time when an LT-RQ is received by the relay nodes 101 to 103 and the turn node 104. FIG. 15 shows an operational flowchart at a time when an LT-RP is transmitted by the relay nodes 101 to 103 and the turn node 104. Incidentally, the flowchart of transmission by the reference node 100 of the LT-RQ is similar to that shown in FIG. 9. The flowchart of reception by the reference node 100 and the relay nodes 101 to 103 of the LT-RP is similar to that shown in FIG. 12.

As shown in FIG. 14, the relay nodes 101 to 103 and the turn node 104 receive an LT-RQ or a replica of the LT-RQ (Step S1501). The OAM frame classification filter 900 extracts a target address from the received frame, and notifies the target address filter 910 of the target address (Step S1502). The target address filter 910 makes a determination as to whether the target address is that of the local node (Step S1503).

When the target is the local node, i.e. when the local node is the turn node 104, the OAM frame termination unit 920 terminates the received frame (Step S1504). Moreover, the target address filter 910 makes a determination as to whether the received frame is an LT-RQ or replica thereof (Step S1505). When the received frame is a replica of an LT-RQ, the target address filter 910 proceeds to an LT-RP replication process described below (Step S1506).

When the target of the received frame is another node (Step S1503: No), i.e. when the local node is one of the relay nodes 101 to 103, the target address filter 910 makes a determination as to whether the received frame is an LT-RQ or replica thereof (Step S1507). When the received frame is a replica of an LT-RQ, the target address filter 910 proceeds to an LT-RP replication process (Step S1506). When the received frame is an LT-RQ, the target address filter 910 transfers the LT-RQ to the TTL subtracter 940. The TTL subtracter 940 subtracts "1" from a TTL value of the transferred LT-RQ (Step S1508), and transfers the LT-RQ, which is obtained by the subtraction, to the frame transmitter 960 and the frame replication unit 970.

After receiving the LT-RQ from the TTL subtracter 940, the frame replication unit 970 generates a replica frame thereof, and transfers the replica frame to the frame transmitter 960 (Step S1509).

As for the LT-RQ from the TTL subtracter 940, the frame transmitter 960 acquires from the forwarding table 950 the output port information. Then, the frame transmitter 960 queues the LT-RQ in the priority buffer (for forward path) 840 of a corresponding output port to transfer the LT-RQ to the next hop (Step S1510).

The frame transmitter 960 queues the LT-RQ replica frame, which is transferred from the frame replication unit 970, in the non-priority buffer (for forward path) 841 of the above output port to transmit the LT-RQ replica frame (Step S1511).

The relay nodes 101 to 103 proceed to an LT-RP process (Step S1512).

With reference to FIG. 15, a procedure of the processes (S1506, S1512) by the relay nodes 101 to 103 and the turn node 104 for an LT-RP or replica thereof will be described.

When a to-be-executed process is an LT-RP process (Step S1600: Yes), the OAM frame generator 930 generates an LT-RP targeted at the reference node 100 (Step S1601). The TTL subtracter 940 subtracts "1" from a TTL value of the generated LT-RP, and transfers the resultant LT-RP to the frame transmitter 960 and the frame replication unit 970. As for the LT-RP, the frame transmitter 960 acquires from the forwarding table 950 the output port information, and queues the LT-RP in the priority buffer (for return path) 842 to transmit the LT-RP (Step S1602).

When a to-be-executed process is an LT-RP replication process (Step S1600: No), the frame replication unit 970 generates a replica frame of the LT-RP, which is received from the TTL subtracter 940, and transfers the replica frame to the frame transmitter 960 (Step S1603). The frame transmitter 960 queues the LT-RP replica frame in the priority buffer (for return path) 842 of the above output port to transmit the LT-RP replica frame (Step S1604).

As described above, a process by the reference node 100 of receiving an LT-RP and a replica thereof is similar to that shown in FIG. 12. However, the congestion determination process (S1305) for the forward path is different from the one for the above return path. Accordingly, the difference will be described.

The congestion determination process for forward-path communication is the same as the one for the above return path in that the reference node 100 calculates the arrival-time difference of the LT-RP and replica thereof from the same node. In the congestion determination process for the forward path, if the calculated arrival-time difference exceeds the threshold value, it is determined that the preceding hop of the forward path of a node that has received the LT-RP used for the calculation has been congested. More specifically, for example, if the arrival-time difference related to the node 104 of FIG. 4 exceeds the threshold value, the node 103, which comes immediately before the node 104 on the forward path, is recognized as a congested node in forward-path communication. The node 103 is a node that transmits an LT-RQ replica in the non-priority buffer (for forward path) 841 to the node 104.

Specific Example 1-2

The following describes a specific example of how to detect congestion in the above forward-path communication. In the example described below, the time needed to pass through a buffer is defined in the same way as that in the above Specific Example 1-1 (FIG. 13).

Figure 16:
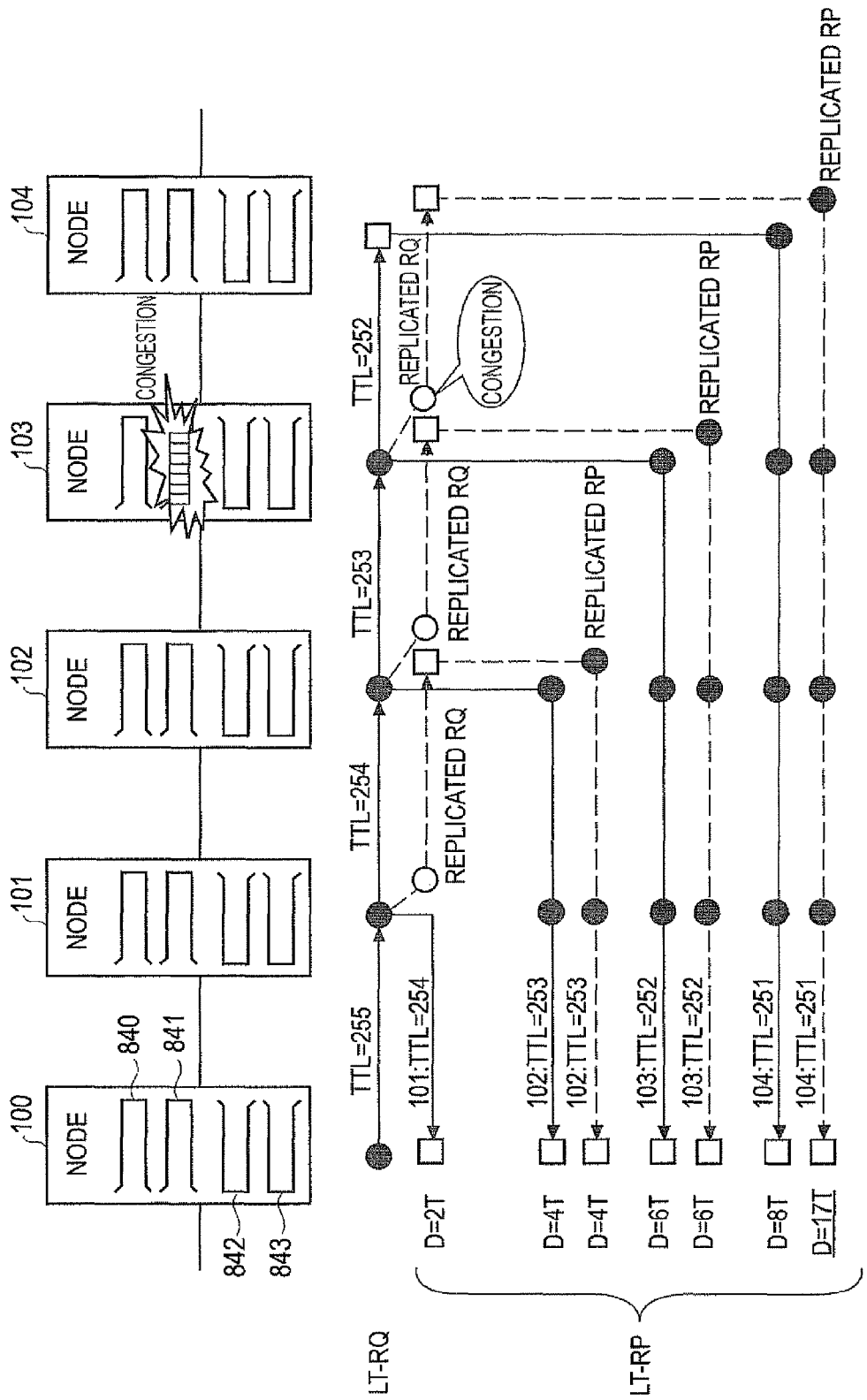
FIG. 16 An explanatory diagram as to a specific example of forward-path inspection according to the first embodiment of the present invention.

FIG. 16 shows a specific example of congestion detection (FIG. 4) in forward-path communication. In the present example, suppose that the non-priority buffer (for forward path) 841 of the node 103 is congested. Incidentally, in the case of the node 101, only an LT-RP is returned, and the arrival time thereof is D=2T.

The arrival time needed for an LT-RP to arrive from the node 102 is D=4T. As for a replica frame of the LT-RP, the following Ts are required: T, which is used by the reference node 100 to transmit an LT-RQ; T, which is used in the node 101 to transmit an LT-RQ replica; T, which is used to transmit an LT-RP replica from the node 102 for the LT-RQ replica; and T, which is used by the node 101 to transfer the LT-RP replica. Accordingly, the arrival time of the LT-RP replica frame from the node 102 is D=4T, and there is no difference in arrival time between the LT-RP replica frame and the LT-RP. As a result, the reference node 100 determines that the node 101 of the preceding hop of the node 102 is not congested in forward-path communication.

Similarly, the arrival time of the LT-RP from the node 103 is D=6T. The arrival time of the replica frame thereof is similarly D=6T. Therefore, there is no difference in arrival time. As a result, the reference node 100 determines that the node 102 of the preceding hop of the node 103 is not congested on the forward path.

However, in the node 103, the non-priority buffer (for forward path) 841 is congested. As for the node 104 of the next hop of the node 103, the arrival time of the LT-RP is D=8T. On the other hand, the arrival time of the LT-RP replica frame, which uses the congested non-priority buffer (for forward path) 841, is D=17T (T+T+T+10T+T+T+T+T=17T). The reference node 100 determines that the node 103, which comes immediately before the node 104, has been congested in forward-path communication because the arrival-time difference 9T exceeds the threshold value 3T.

As described above, according to the first embodiment, with the use of the LT technique, it is possible for the reference node 100 to detect a congested node in return-path communication on the network, as well as a congested node in forward-path communication. Therefore, it is possible to identify a performance bottleneck of the network.

Second Embodiment

According to the present embodiment, in order to transmit inspection and response signals of the present invention, the LoopBack (LB) technique of the above ITU-T recommendation Y.1731 is used. In the case of the LB, in response to an inspection signal transmitted from the reference node to the target node, only the target node returns a response signal.

Figure 17:
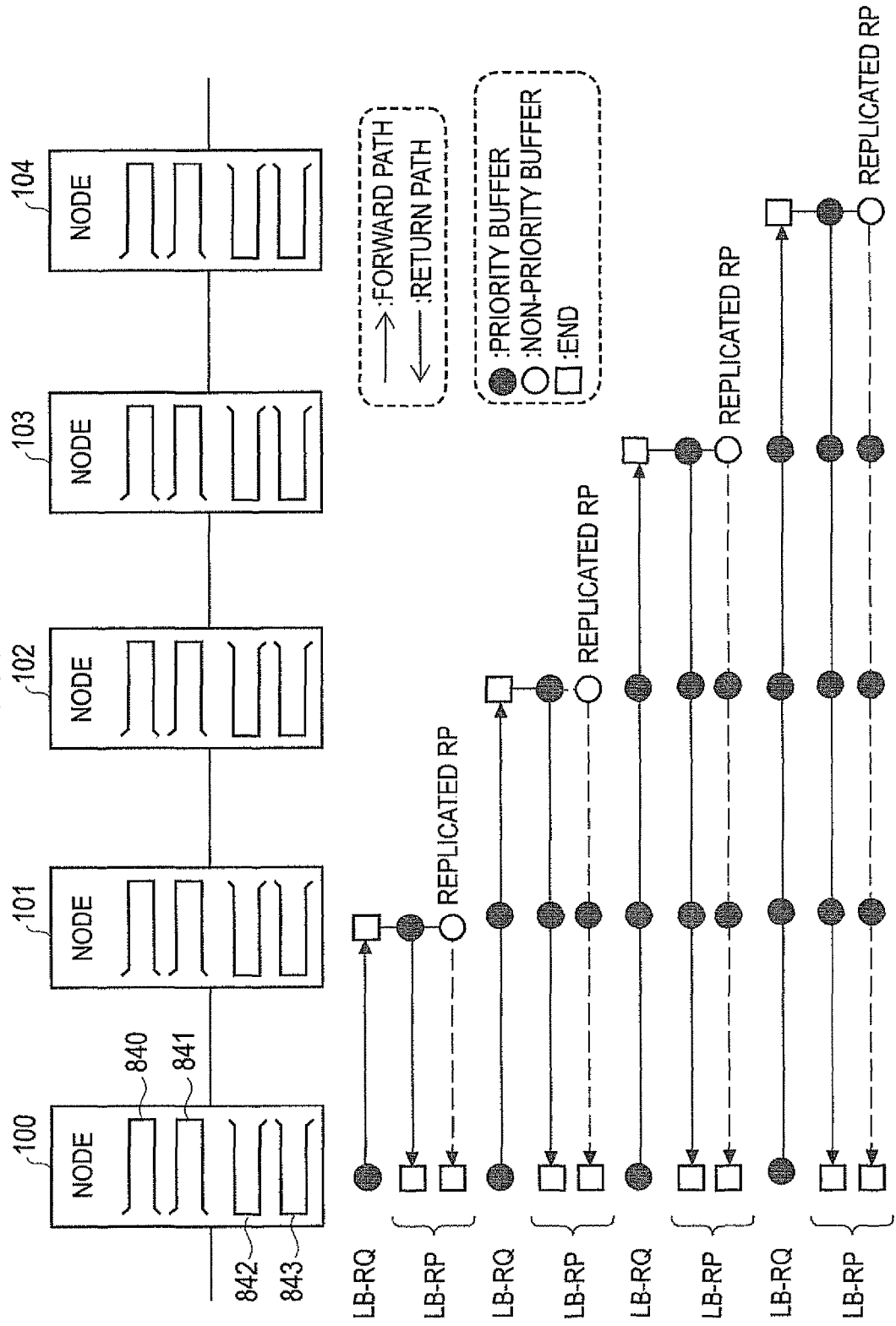
FIG. 17 An explanatory diagram as to congestion detection of return-path communication according to a second embodiment of the present invention.
Figure 18:
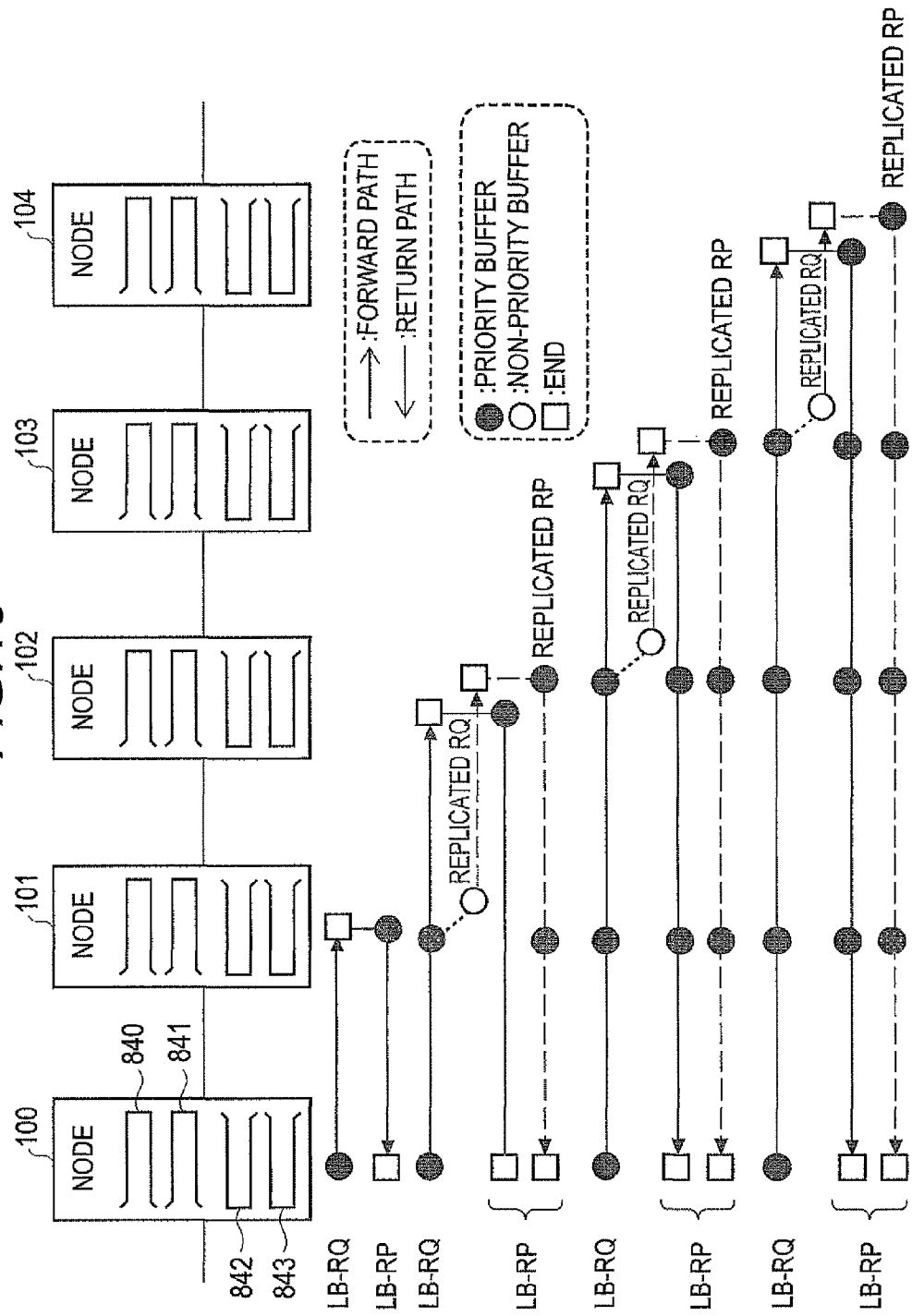
FIG. 18 An explanatory diagram as to congestion detection of forward-path communication according to the second embodiment of the present invention.

The outline of the present embodiment will be described with reference to FIGS. 17 and 18. The lower section of FIG. 17 shows an operation of detecting congestion in return-path communication. The lower section of FIG. 18 shows an operation of detecting congestion in forward-path communication. The present embodiment is basically the same as the above first embodiment: from a non-priority buffer corresponding to a to-be-inspected path (forward/return path), a replica of an inspection or response signal is transmitted. In this case, an inspection signal of the present embodiment is an LB-Request frame (referred to as "LB-RQ," hereinafter); a response signal is an LB-Reply frame (referred to as "LB-RP," hereinafter).

According to the first embodiment in which the above LT technique is used, the target of an LT-RQ from the reference node 100 is only the turn node 104. According to the present embodiment, the targets of an LB-RQ from the reference node 100 are all nodes except the reference node 100. That is, as shown in FIGS. 17 and 18, the reference node 100 separately issues an LB-RQ targeted at each of the nodes 101 to 104. As for an LB-RP transmitted from each of the nodes 101 to 104 to the reference node 100, as in the above LT technique, the target is only the reference node 100.

The configuration of each of the nodes 100 to 104 of the present embodiment is basically the same as that in the first embodiment (FIGS. 6 to 8) except for the following: according to the present embodiment, since the TTL process of the LT technique is unnecessary, the TTL subtracter 940 is omitted from the OAM controller 810 (FIG. 8). Moreover, as for the transmission of an LB-RQ on the forward path, a series of relay nodes leading up to the target node do not transmit back a response (LB-RP) even after receiving an LB-RQ.

Figure 19:
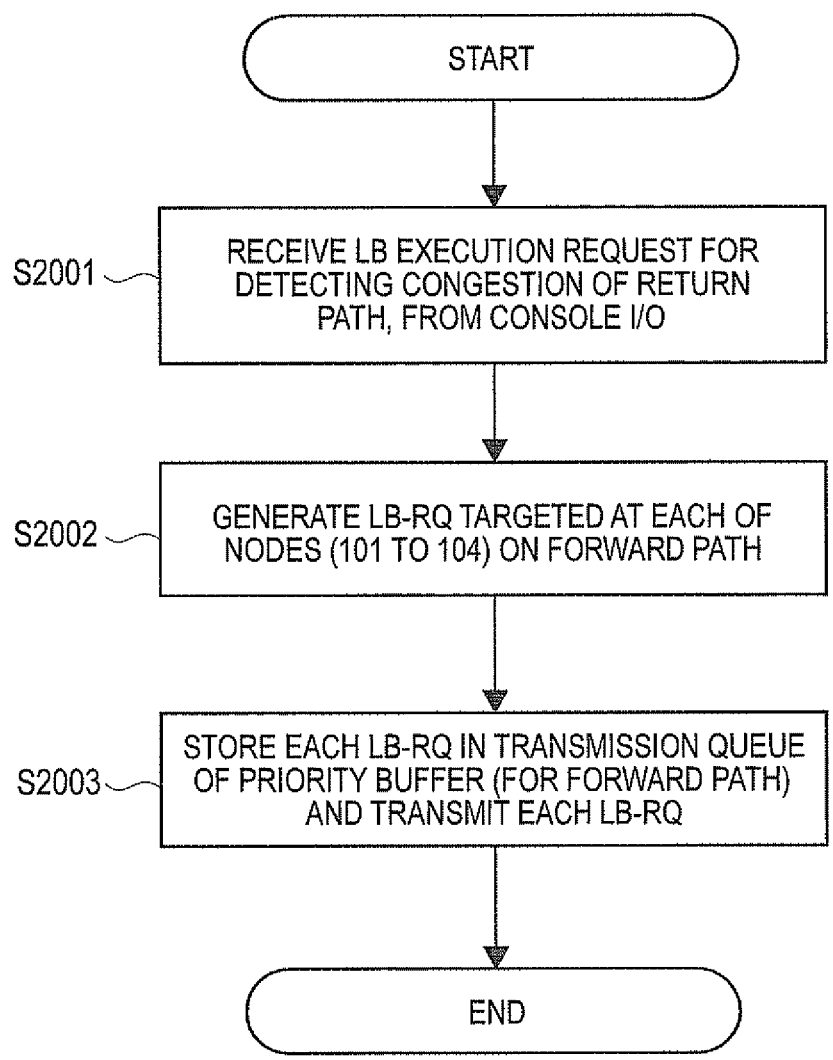
FIG. 19 A flowchart as to LB-RQ transmission according to the second embodiment of the present invention.
Figure 20:
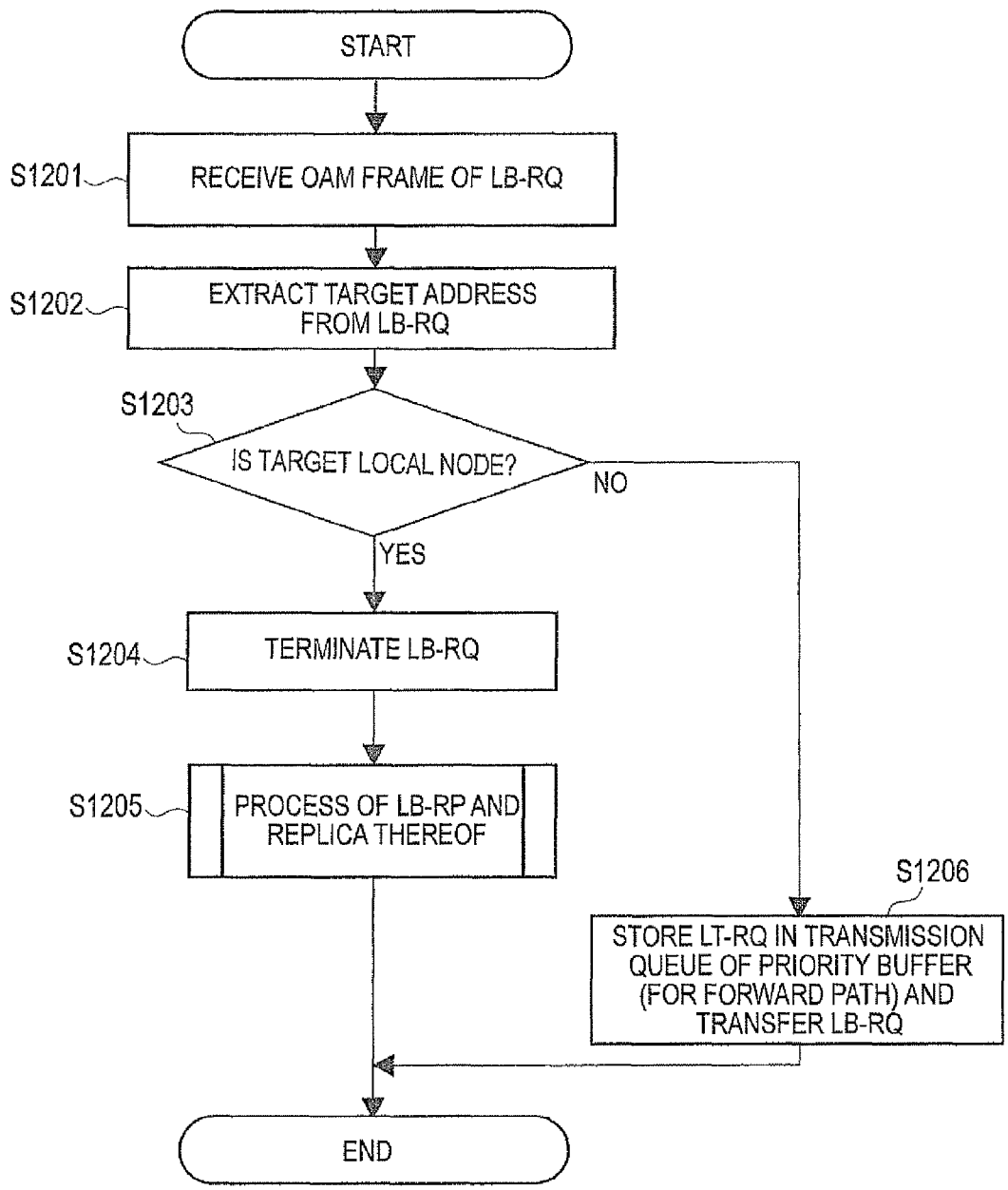
FIG. 20 A flowchart as to LB-RQ reception at a time when a return path is inspected according to the second embodiment of the present invention.
Figure 21:
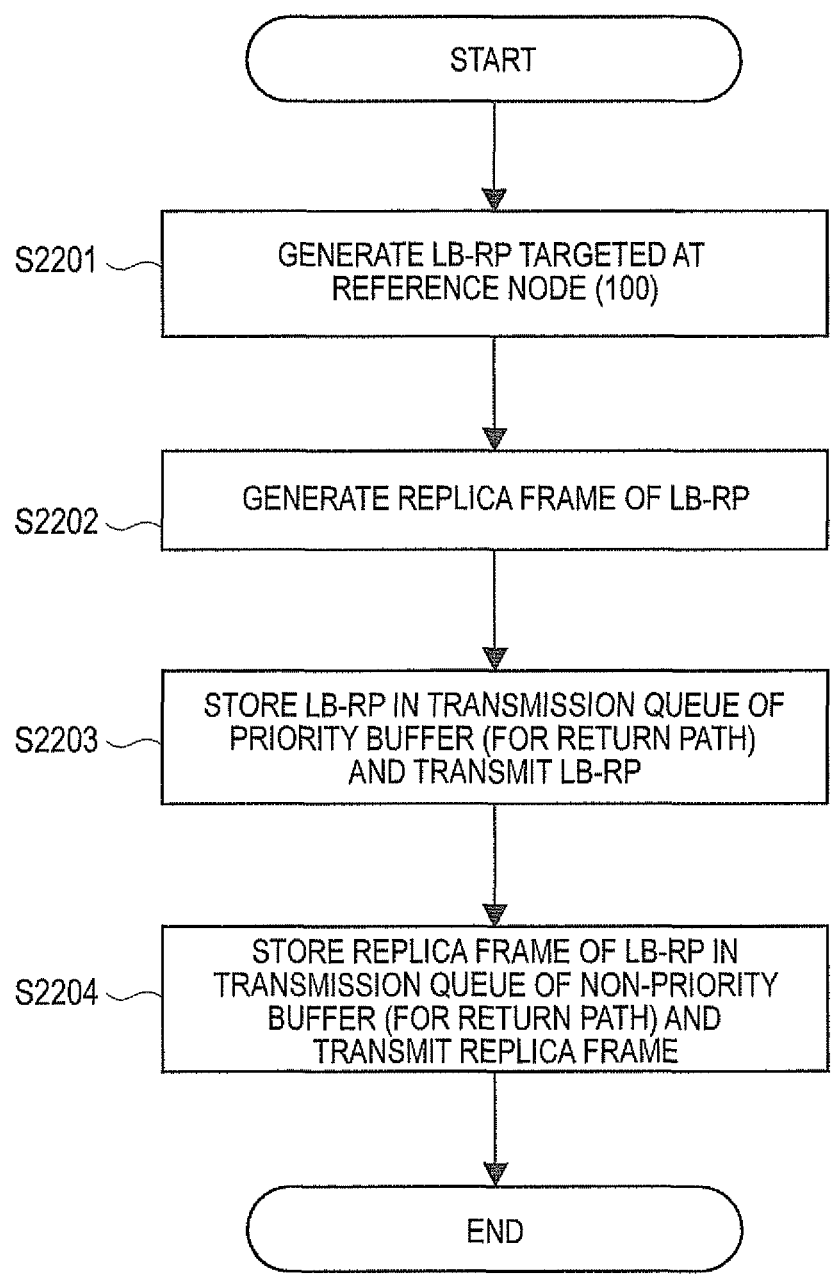
FIG. 21 A flowchart as to LB-RP transmission at a time when a return path is inspected according to the second embodiment of the present invention.
Figure 22:
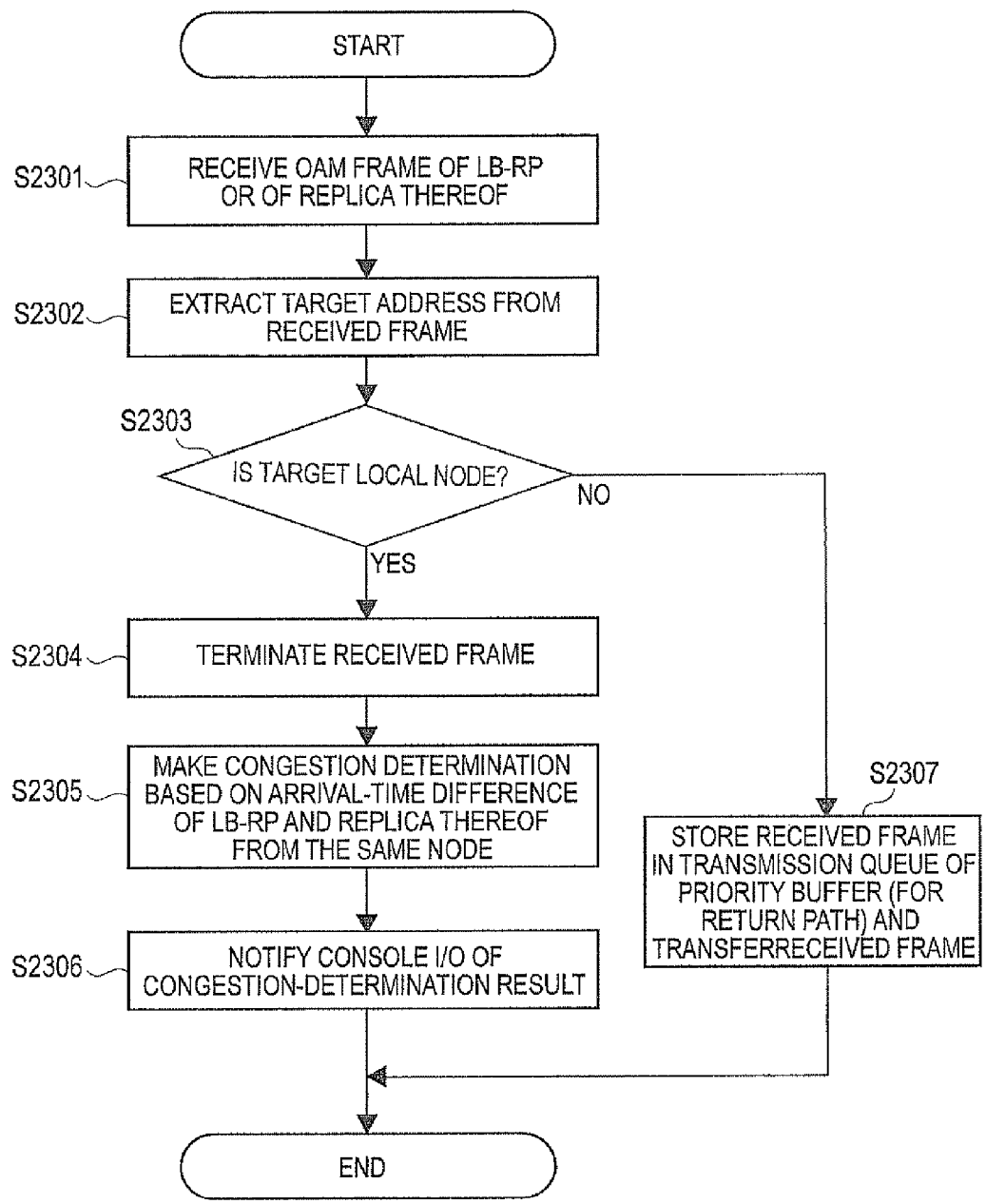
FIG. 22 A flowchart as to LB-RP reception according to the second embodiment of the present invention.

With reference to flowcharts shown in FIGS. 19 to 22, an operation of each node associated with a process by LB of detecting congestion on the forward path (FIG. 17) will be described. FIG. 19 is an operational flowchart as to transmission of an LB-RQ by the reference node 100. FIG. 20 is an operational flowchart as to reception of an LB-RQ by the nodes 101 to 104. FIG. 21 is an operational flowchart as to transmission of an LB-RP by the nodes 101 to 104. FIG. 22 is an operational flowchart as to reception of an LB-RP by the reference node 100 and the nodes 101 to 103.

As shown in FIG. 19, the OAM frame generator 930 of the reference node 100 receives an LB execution request, which is aimed at detecting congestion of the return path, from the console I/O 760 (Step S2001). The LT execution request includes, as a target address, address information of each of the nodes (101 to 104) on the forward path. The OAM frame generator 930 separately generates an LB-RQ targeted at each of the nodes 101 to 104 (Step S2002).

The frame transmitter 960 acquires from the forwarding table 950 the output port information associated with the target address of each LB-RQ, and queues each LB-RQ in the priority buffer (for forward path) 840 of a corresponding output port, thereby transmitting each LB-RQ to the forward path (Step S2003).

As shown in FIG. 20, the nodes 101 to 104, which each become a relay node or target node, receive the LB-RQ transmitted from the reference node 100 (Step S2101). Then, the nodes 101 to 104 extract a target address from the LB-RQ (Step S2102). The target address filter 910 makes a determination as to whether the extracted address is that of the local node (Step S2103). When the target of the LB-RQ is the local node, the OAM frame termination unit 920 performs a termination process on the LB-RQ (Step S2104), and proceeds to a process described below, which is associated with an LB-RP and a replica frame thereof (Step S2105).

When the target of the received LB-RQ is another node (Step S2103: No), the frame transmitter 960 acquires the output port information for the target address from the forwarding table 950, and queues the LB-RQ in the priority buffer (for forward path) 840 of a corresponding output port to transfer the LB-RQ to the next hop (Step S2106).

With reference to FIG. 21, a procedure of the process (S2105) by each of the nodes 101 to 104 as to an LB-RP will be described.

After receiving an LB-RP generation instruction from the OAM frame termination unit 920, the OAM frame generator 930 uses an address of the reference node 100, which is specified as a target address, to generate an LB-RP (Step S2201). The OAM frame generator 930 then transfers the generated LB-RP to the frame transmitter 960 and the frame replication unit 970.

The frame replication unit 970 generates a replica frame of the LB-RP, and transfers the replica frame to the frame transmitter 960 (Step S1202).

The frame transmitter 960 acquires from the forwarding table 950 the output port information, and queues the LB-RP in the priority buffer (for return path) 842 of a corresponding output port to transmit the LB-RP (Step S2203). Moreover, the frame transmitter 960 queues the LB-RP replica frame, which is transmitted from the frame replication unit 970, in the non-priority buffer (for return path) 843 of the above output port to transmit the LB-RP replica frame (Step S2204).

As shown in FIG. 22, after receiving the LB-RP or replica frame thereof on the return path (Step S2301), the reference node 100 and the nodes 101 to 103 extract a target address from the received frame (Step S2302). The target address filter 910 makes a determination as to whether the target address is that of the local node (Step S2303).

When the target of the LB-RP or replica thereof is the local node, i.e. when the local node is the reference node 100, the OAM frame termination unit 920 performs a process of terminating the LB-RP or replica thereof (Step S2304).

The OAM frame termination unit 920 makes a determination as to whether the node is congested on the basis of the difference in arrival time between the LB-RP and the replica frame thereof, which are transmitted from the same node (Step S2305). To make the above determination, the OAM frame termination unit 920 uses the source information and TTL value, which are written into the received frame, to recognize a combination of the LB-RP and the replica frame thereof, which are transmitted from the same node. Then, the OAM frame termination unit 920 calculates the arrival-time difference of each of the recognized combinations. If the difference exceeds a predetermined threshold value, the OAM frame termination unit 920 determines that the target node has been congested in return-path communication. The console I/O 760 is notified of the congestion-determination result (Step S2306).

When the target of the received LB-RP or replica thereof is another node (Step S2303: No), the frame transmitter 960 checks the forwarding table 950 to acquire the output port information for the target (100). Then, the frame transmitter 960 queues the received LB-RP or replica thereof in the priority buffer (for return path) 842 of a corresponding output port to transfer the received LB-RP or replica thereof to the next hop (Step S2307).

Specific Example 2-1

The following describes a specific example of how to detect congestion in the above return-path communication. In the example below, as for the time needed to pass through each priority/non-priority buffer, the time for the case where no buffer is congested is represented by T, and the time for the case where a buffer is congested is represented by 10T. In addition, a threshold value that is used in the reference node 100 to make a congestion determination is represented by 3T.

Figure 23:
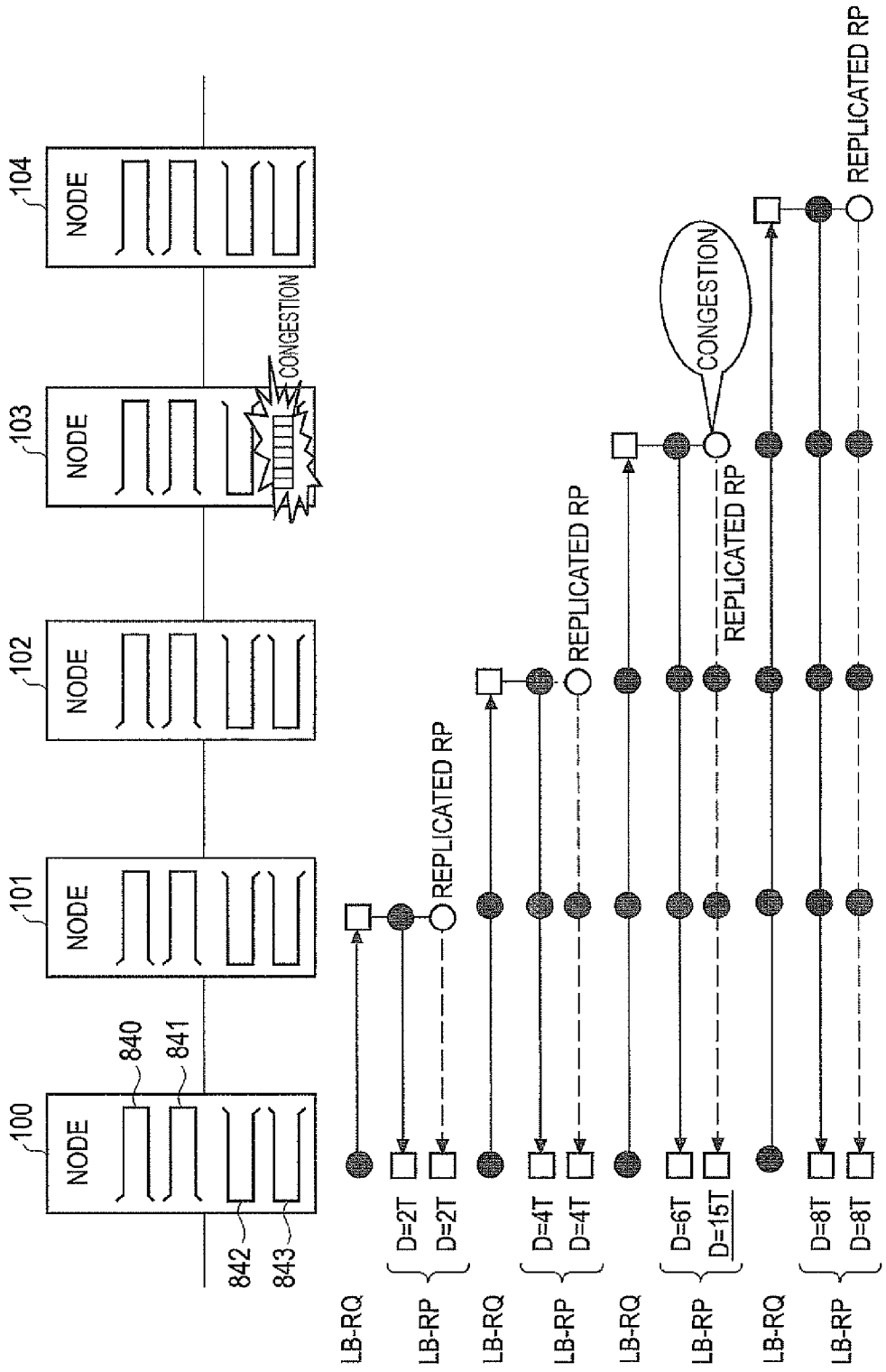
FIG. 23 An explanatory diagram as to a specific example of return-path inspection according to the second embodiment of the present invention.

FIG. 23 shows a specific example of congestion detection (FIG. 17) in return-path communication. In the present example, suppose that the non-priority buffer (for return path) 843 of the node 103 is congested.

In the case of the node 101, T is required for transmission of an LB-RQ in the reference node 100; T is required for transmission of an LB-RP in the node 101, as well as for transmission of a replica frame thereof. In this case, the arrival time needed for the LB-RP to arrive at the reference node 100 from the node 101 is D=2T. Similarly, the arrival time of the replica frame thereof is D=2T. Therefore, there is no difference in arrival time. Accordingly, the node 100 determines that the node 101 is not congested.

Similarly, in the case of the node 102, the arrival time of the LB-RP is D=4T. The arrival time of the replica frame thereof is similarly D=4T. Therefore, there is no difference in arrival time. In the case of the node 104, the arrival time of the LB-RP is D=8T. The arrival time of the replica frame thereof is similarly D=8T. Therefore, there is no difference in arrival time. Accordingly, the reference node 100 determines that the nodes 102 and 104 are not congested.

However, in the node 103, the non-priority buffer (for return path) 843 is congested. In the case of the node 103, while the arrival time of the LB-RP is D=6T, the arrival time of the LB-RP replica frame, which uses the congested non-priority buffer (for return path) 843, is D=15T (T+T+T+10T+

T+T=15T). Since the arrival-time difference 9T exceeds the threshold value 3T, the reference node 100 determines that the node 103 has been congested in return-path communication.

Figure 24:
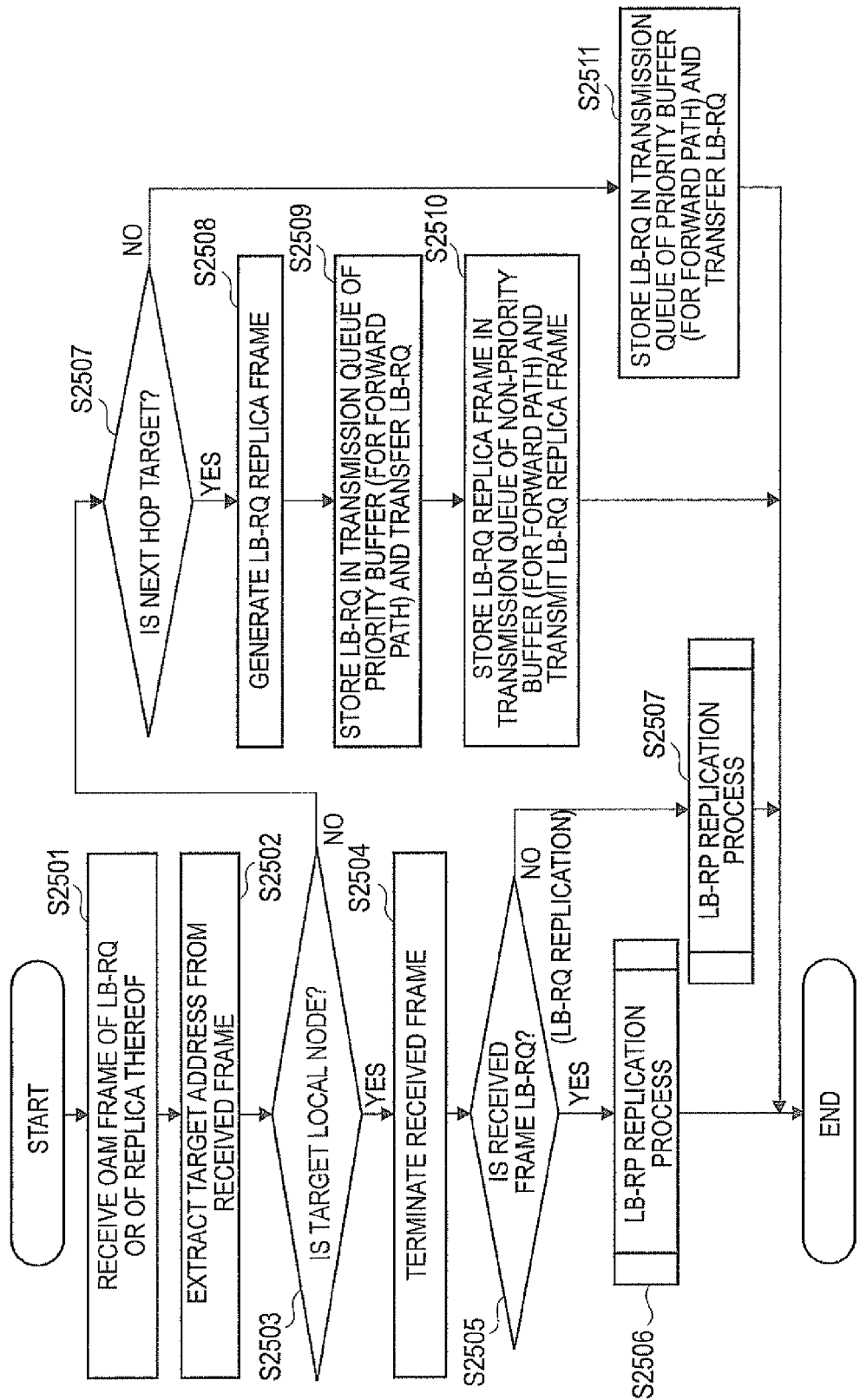
FIG. 24 A flowchart as to LB-RQ reception at a time when a forward path is inspected according to the second embodiment of the present invention.

The following describes an operation of each node as to congestion detection (FIG. 18) of the forward path according to the present embodiment. FIG. 24 shows an operational flowchart at a time when an LB-RQ is received by the each of the nodes 101 to 104 except the reference node 100. FIG. 25 shows an operational flowchart at a time when an LB-RP is transmitted by each of the nodes 101 to 104. Incidentally, the flowchart of transmission by the reference node 100 of the LB-RQ is similar to that shown in FIG. 19. The flowchart of reception by the reference node 100 and the relay nodes 101 to 103 of the LB-RP is similar to that shown in FIG. 22.

As shown in FIG. 24, the nodes 101 to 104 receive an LB-RQ or a replica thereof. (Step S2501). The OAM frame classification filter 900 extracts a target address from the received frame, and notifies the target address filter 910 of the target address (Step S2502). The target address filter 910 makes a determination as to whether the target address is that of the local node (Step S2503).

When the target is the local node, the OAM frame termination unit 920 terminates the received frame (Step S2504). Moreover, the target address filter 910 makes a determination as to whether the received frame is an LB-RQ or replica thereof (Step S2505). When the received frame is an LB-RQ, the target address filter 910 proceeds to an LB-RP process described below (Step S2506). When the received frame is a replica of an LB-RQ, the target address filter 910 proceeds to an LB-RP replication process described below (Step S2507).

When the target of the received frame is another node (Step S2503: No), the received frame is identified as an LB-RQ, not as a replica frame of an LB-RQ according to the present embodiment. The target address filter 910 transfers the received LB-RQ to the frame transmitter 960, and also makes a determination as to whether the target of the LB-RQ is the next-hop node (S2507). When the target is the next hop, the frame replication unit 970 generates a replica frame of the LB-RQ, and transfers the replica frame to the frame transmitter 960 (Step S2508).

The frame transmitter 960 queues the LB-RQ in the priority buffer (for forward path) 840 of a output port, which is acquired from the forwarding table 950, to transfer the LB-RQ to the next hop (Step S2509). The frame transmitter 960 also queues the LB-RQ replica frame, which is transferred from the frame replication unit 970, in the non-priority buffer (for forward path) 841 of the above output port to transmit the LB-RQ replica frame (Step S2510).

Incidentally, if the target of the received LB-RQ is not the next hop but a node that is two or more hops ahead (Step S2507: No), the frame transmitter 960 queues the LB-RQ in the priority buffer (for forward path) 840 to transfer the LB-RQ (Step S2511). In this case, a replica frame of the LB-RQ is not issued.

With reference to FIG. 25, a procedure of the processes (S2506, S2507) by the nodes 101 to 104 for an LB-RP or replica thereof will be described.

When a to-be-executed process is an LB-RP process (Step S2600: Yes), the OAM frame generator 930 generates an LB-RP targeted at the reference node 100 (Step S2601). The OAM frame generator 930 transfers the generated LB-RP to the frame transmitter 960 and the frame replication unit 970. As for the LB-RP, the frame transmitter 960 acquires from the forwarding table 950 the output port information, and queues the LB-RP in the priority buffer (for return path) 842 to transmit the LB-RP (Step S2602).

When a to-be-executed process is an LB-RP replication process (Step S2600: No), the frame replication unit 970 generates a replica frame of the LB-RP, and transfers the replica frame to the frame transmitter 960 (Step S2603). The frame transmitter 960 queues the LB-RP replica frame in the priority buffer (for return path) 842 of the above output port to transmit the LB-RP replica frame (Step S2604).

In a process of making a congestion determination as to forward-path communication, the way that the reference node 100 calculates the arrival-time difference of the LB-RP and replica thereof from the same node is similar to the one for the above return-path. In the congestion determination process for the forward path, if the calculated arrival-time difference exceeds the threshold value, it is determined that the preceding hop of a node that has transmitted the LB-RP used for the calculation has been congested. More specifically, for example, if the arrival-time difference related to the node 104 of FIG. 18 exceeds the threshold value, the node 103, which comes immediately before the node 104 on the forward path, is recognized as a congested node in forward-path communication. The node 103 is a node that transmits an LB-RQ replica in the non-priority buffer (for forward path) 841 to the node 104.

Specific Example 2-2

The following describes a specific example of how to detect congestion in the above forward-path communication. In the example described below, the time needed to pass through a buffer is defined in the same way as that in the above Specific Example 2-1 (FIG. 23).

FIG. 26 shows a specific example of congestion detection (FIG. 18) in return-path communication. In the present example, suppose that the non-priority buffer (for forward path) 841 of the node 103 is congested. Incidentally, in the case of the node 101, only an LB-RP is returned, and the arrival time thereof is D=2T.

The arrival time needed for an LB-RP to arrive from the node 102 is D=4T. As for a replica frame of the LB-RP, the following Ts are required: T, which is used by the reference node 100 to transmit an LB-RQ; T, which is used in the node 101 to transmit an LB-RQ replica; T, which is used to transmit an LB-RP replica from the node 102 for the LB-RQ replica; and T, which is used by the node 101 to transfer the LB-RP replica. Accordingly, the arrival time of the LB-RP replica frame from the node 102 is D=4T, and there is no difference in arrival time between the LB-RP replica frame and the LB-RP. As a result, the reference node 100 determines that the node 101 of the preceding hop of the node 102 is not congested in forward-path communication.

Similarly, the arrival time of the LB-RP from the node 103 is D=6T. The arrival time of the replica frame thereof is similarly D=6T. Therefore, there is no difference in arrival time. As a result, the reference node 100 determines that the node 102 of the preceding hop of the node 103 is not congested.

However, in the node 103, the non-priority buffer (for forward path) 841 is congested. As for the node 104 of the next hop of the node 103, the arrival time of the LB-RP is D=8T. On the other hand, the arrival time of the LB-RP replica frame, which uses the congested non-priority buffer (for forward path) 841, is D=17T (T+T+T+10T+T+T+T+T=17T). The reference node 100 determines that the node 103, which is the preceding hop of the node 104, has been congested in return-path communication because the arrival-time difference 9T exceeds the threshold value 3T.

As described above, according to the second embodiment, with the use of the LB technique, it is possible for the reference node 100 to detect a congested node in return-path communication on the network, as well as a congested node in forward-path communication. Therefore, it is possible to identify a performance bottleneck of the network.

The present invention is not limited to the above embodiments. Modifications can be made within the scope of the appended claims when necessary. For example, a Trace-route technique, which is used for a TCP/IP network, may be substituted for the LT technique of the first embodiment. Moreover, a Ping technique of a TCP/IP network may be substituted for the LB technique of the second embodiment.

The communication node shown in FIG. 8 can be used for any of the following nodes: a reference node, a relay node and a turn node. However, when the communication node is used exclusively for the reference node, when the communication node is used exclusively for the relay node, or when the communication node is used exclusively for the turn node, an unnecessary component of each node may be omitted. For example, for the relay or turn node, a component for transmitting an LT-RQ as an inspection signal is not needed. For the reference node, a component for transmitting, as a response signal, an LB-RP or replica thereof is unnecessary.

The communication node, described in the above embodiments or examples of the present invention, is made up of hardware, such as a dedicated IC. However, the congestion detection method of the present invention can be realized not only by the communication node made up of hardware but also by a computer that operates on a program, in which the functions of the communication node are recorded. The present invention can be embodied as a program, which enables a computer to operate as each of the above nodes (100 to 104), and as a computer-readable recording medium in which the program is stored.

The program is stored in a computer-readable information recording medium, such as CD-ROM, DVD and flash memory, and is offered via a network, such as the Internet. A computer reads and executes the program to realize the functions of the communication node.

The above has described the exemplary embodiments and examples of the present invention. However, the present invention may be embodied in other various forms without departing from the spirit and essential characteristics thereof, which are defined by the claims of the present application. The described embodiments are therefore to be considered only as illustrative, not as restrictive. The scope of the present invention is indicated by the appended claims, and is not restricted by the specification or abstract. Furthermore, all modifications and alterations which come within the meaning and range of equivalency of the claims are to be embraced within the scope of the present invention.

The present application claims priority from Japanese Patent Application No. 2009-140312 filed on Jun. 11, 2009, the entire contents of which being incorporated herein by reference.

The whole or part of the exemplary embodiments disclosed above can be described as, but not limited to, the following supplementary notes.

(Supplementary Note 1)

A congestion detection method for a network where a forward path and a return path are set up, the forward path leading from a reference node to a turn node via at least one relay node, and the return path leading from the turn node to the reference node via at least the one relay node, the method including:

transmitting an inspection signal, which is used to inspect forward-path or return-path communication, from the reference node;

transmitting a response signal to the inspection signal in a priority class from each of the relay node and turn node of the forward path, or from the relay node or turn node of the forward path, to the reference node;

transmitting a replica of the response signal in a non-priority class from each of the relay node and turn node of the forward path, or from the relay node or turn node of the forward path, to the return path, and transferring the replica in a priority class to the reference node by using the relay node that receives the replica of the response signal, if the inspection signal corresponds to an inspection of return-path communication;

transmitting a replica of the inspection signal in a non-priority class from the relay node of the forward path to the forward path, and transmitting a replica of the response signal in a priority class from each of the relay node and turn node that receive the replica of the inspection signal, or from the relay node or turn node that receives the replica of the inspection signal, to the reference node, if the inspection signal corresponds to an inspection of forward-path communication; and calculating a difference between time needed for a response signal, which is transmitted from the relay or turn node, to arrive at the reference node and time needed for a replica thereof, which is transmitted from the same relay or turn node, to arrive at the reference node, and determining, when the arrival-time difference exceeds a threshold value, that congestion occurs in forward-path or return-path communication of the relay or turn node.

(Supplementary Note 2)

The congestion detection method according to reference 1, wherein the inspection signal and the response signal are transmitted on the network in the form of LinkTrace, which is defined in ITU-T recommendation Y.1731.

(Supplementary Note 3)

The congestion detection method according to reference 1, wherein the inspection signal and the response signal are transmitted on the network in the form of LoopBack, which is defined in ITU-T recommendation Y.1731.

(Supplementary Note 4)

A communication node that is not a reference node and is for a network where a forward path and a return path are set up, the forward path leading from the reference node to a turn node, the return path leading from the turn node to the reference node, the communication node comprising a switching unit that transmits, after receiving an inspection signal that is transmitted from the reference node and is used to inspect forward-path or return-path communication, a response signal to the inspection signal in a priority class to the reference node; transmits a replica of the response signal in a non-priority class to the return path if the inspection signal corresponds to an inspection of return-path communication; transfers, after receiving a replica of the response signal, the replica in a priority class to the reference node; transmits a replica of the inspection signal in a non-priority class to the forward path if the inspection signal corresponds to an inspection of forward-path communication; and transmits, after receiving a replica of the inspection signal, the replica of the response signal in a priority class to the reference node.

(Supplementary Note 5)

The communication node according to reference 4, wherein
the switching unit includes:
an analyzer that analyzes whether an input signal is the inspection signal;
a signal generator that generates the response signal;
a signal replication unit that generates a replica of the response signal;
a signal termination unit that terminates the inspection signal or a replica of the inspection signal; and
a filter that receives the inspection signal from the analyzer, transfers the inspection signal to the signal termination unit if the communication node is a turn node, and instructs the signal generator to generate the response signal and the signal replication unit to generate a replica of the response signal if the communication node is not the turn node.

(Supplementary Note 6)

The communication node according to reference 4, wherein
the inspection signal and the response signal are transmitted on the network in the form of LinkTrace, which is defined in ITU-T recommendation Y.1731.

(Supplementary Note 7)

The communication node according to reference 4, wherein
the inspection signal and the response signal are transmitted on the network in the form of LoopBack, which is defined in ITU-T recommendation Y.1731.

(Supplementary Note 8)

A communication node that works as a reference node and is for a network where a forward path and a return path are set up, the forward path leading from the reference node to a turn node, the return path leading from the turn node to the reference node, the communication node comprising
a control unit that transmits an inspection signal used to inspect forward-path or return-path communication; calculates, for the inspection signal, a difference between time needed for a response signal, which is transmitted from a node of the network, to arrive at the reference node and time needed for a replica thereof, which is transmitted from the same node, to arrive at the reference node; and determines, when the arrival-time difference exceeds a threshold value, that congestion occurs in forward-path or return-path communication of the node.

(Supplementary Note 9)

The communication node according to reference 8, wherein
the control unit includes:
a signal generator that generates the inspection signal; and
a signal termination unit that terminates the response signal or a replica of the response signal, calculates a difference between time needed for a response signal, which is transmitted from a node of the network, to arrive at the reference node and time needed for a replica thereof, which is transmitted from the same node, to arrive at the reference node, and determines, when the arrival-time difference exceeds a threshold value, that congestion occurs in forward-path or return-path communication of the node.

(Supplementary Note 10)

The communication node according to reference 8, wherein the inspection signal and the response signal are transmitted on the network in the form of LinkTrace, which is defined in ITU-T recommendation Y.1731.

(Supplementary Note 11)

The communication node according to reference 8, wherein the inspection signal and the response signal are transmitted on the network in the form of LoopBack, which is defined in ITU-T recommendation Y.1731.

(Supplementary Note 12)

A system, comprising
a network where a communication node claimed in any one of references 4 to 7 and
a communication node claimed in any one of references 8 to 11 are connected.

(Supplementary Note 13)

A computer-readable information recording medium storing a program which causes a computer to function as a communication node claimed in any one of references 4 to 7.

(Supplementary Note 14)

A computer-readable information recording medium storing a program which causes a computer to function as a communication node claimed in any one of references 8 to 119.

REFERENCE SIGNS LIST

100: Reference node
101 to 104: Node
840: Priority buffer (for forward path)
841: Non-priority buffer (for forward path)
842: Priority buffer (for return path)
843: Non-priority buffer (for return path)

The invention claimed is:

1. A congestion detection method for a network where a forward path and a return path are set up, the forward path leading from a reference node to a turn node via at least one relay node, the return path leading from the turn node to the reference node via at least the one relay node, the method comprising:
transmitting an inspection signal including inspection information corresponding to an inspection of one of forward-path communication and return-path communication, from the reference node, the inspection information including target address information;
transmitting a response signal to the inspection signal in a priority class from one or more of the relay node and the turn node of the forward path to the reference node based on the target address information;
transmitting a replica of the response signal in a non-priority class from one or more of the relay node and the turn node of the forward path to the return path, and transferring the replica in a priority class to the reference node by using the relay node that receives the replica of the response signal, when the inspection information of the inspection signal corresponds to the inspection of return-path communication;
transmitting a replica of the inspection signal in a non-priority class from the relay node of the forward path to the forward path, and transmitting a replica of the response signal in a priority class from one of more of the relay node and the turn node that receive the replica of the inspection signal to the reference node, when the inspection information of the inspection signal corresponds to the inspection of forward-path communication; and
calculating, by a controller of the reference node, a difference between time needed for a response signal, which is transmitted from the relay or turn node, to arrive at the reference node and time needed for a replica thereof, which is transmitted from the same relay or turn node, to arrive at the reference node, and determining, when the arrival-time difference exceeds a threshold value, that congestion occurs in forward-path or return-path communication of the relay or turn node.

2. The congestion detection method according to claim 1, wherein the inspection signal and the response signal are transmitted on the network in the form of LinkTrace, which is defined in ITU-T recommendation Y.1731.

3. The congestion detection method according to claim 1, wherein the inspection signal and the response signal are transmitted on the network in the form of LoopBack, which is defined in ITU-T recommendation Y.1731.

4. A communication node that is not a reference node and is for a network where a forward path and a return path are set up, the forward path leading from the reference node to a turn node, the return path leading from the turn node to the reference node, the communication node comprising:
   a switching unit that transmits, after receiving an inspection signal that is transmitted from the reference node and includes inspection information corresponding to an inspection of one of forward-path communication and return-path communication, a response signal to the inspection signal in a priority class to the reference node, the inspection information including target address information, the response signal being transmitted based on the target address information in the inspection signal; transmits a replica of the response signal in a non-priority class to the return path when the inspection information of the inspection signal corresponds to the inspection of return-path communication; transfers, after receiving a replica of the response signal, the replica in a priority class to the reference node; transmits a replica of the inspection signal in a non-priority class to the forward path when inspection information of the inspection signal corresponds to the inspection of forward-path communication; and transmits, after receiving a replica of the inspection signal, the replica of the response signal in a priority class to the reference node.

5. The communication node according to claim 4, wherein the switching unit includes:
   an analyzer that analyzes whether an input signal is the inspection signal;
   a signal generator that generates the response signal;
   a signal replication unit that generates a replica of the response signal;
   a signal termination unit that terminates the inspection signal or a replica of the inspection signal; and
   a filter that receives the inspection signal from the analyzer, transfers the inspection signal to the signal termination unit if the communication node is a turn node, and instructs the signal generator to generate the response signal and the signal replication unit to generate a replica of the response signal if the communication node is not the turn node.

6. The communication node according to claim 4, wherein the inspection signal and the response signal are transmitted on the network in the form of LinkTrace, which is defined in ITU-T recommendation Y.1731.

7. The communication node according to claim 4, wherein the inspection signal and the response signal are transmitted on the network in the form of LoopBack, which is defined in ITU-T recommendation Y.1731.

8. A communication node that works as a reference node and is for a network where a forward path and a return path are set up, the forward path leading from the reference node to a turn node, the return path leading from the turn node to the reference node, the communication node comprising:
   a control unit of the reference node that transmits an inspection signal including inspection information corresponding to an inspection of one of forward-path communication and return-path communication, the inspection information including target address information; calculates, for the inspection signal, a difference between time needed for a response signal, which is transmitted from one of the nodes of the network, to arrive at the reference node and time needed for a replica thereof, which is transmitted from the same node, to arrive at the reference node, the response signal being transmitted based on the target address information of the inspection signal; and determines, when the arrival-time difference exceeds a threshold value, that congestion occurs in forward-path or return-path communication of the node.

9. The communication node according to claim 8, wherein the control unit includes:
   a signal generator that generates the inspection signal; and
   a signal termination unit that terminates the response signal or a replica of the response signal, calculates a difference between time needed for a response signal, which is transmitted from a node of the network, to arrive at the reference node and time needed for a replica thereof, which is transmitted from the same node, to arrive at the reference node, and determines, when the arrival-time difference exceeds a threshold value, that congestion occurs in forward-path or return-path communication of the node.

10. The communication node according to claim 8, wherein the inspection signal and the response signal are transmitted on the network in the form of LinkTrace, which is defined in ITU-T recommendation Y.1731.

11. The communication node according to claim 8, wherein the inspection signal and the response signal are transmitted on the network in the form of LoopBack, which is defined in ITU-T recommendation Y.1731.

12. A system, comprising:
   a network where a communication node claimed in claim 4 is connected to a communication node that works as a reference node and is for a network where a forward path and a return path are set up, the forward path leading from the reference node to a turn node, the return path leading from the turn node to the reference node, the communication node comprising:
   a control unit that transmits an inspection signal used to inspect forward-path or return-path communication; calculates, for the inspection signal, a difference between time needed for a response signal, which is transmitted from a node of the network, to arrive at the reference node and time needed for a replica thereof, which is transmitted from the same node, to arrive at the reference node; and determines, when the arrival-time difference exceeds a threshold value, that congestion occurs in forward-path or return-path communication of the node.

13. A non-transitory computer-readable information recording medium storing a program which causes a computer to function as a communication node claimed in claim 4.

14. A non-transitory computer-readable information recording medium storing a program which cause a computer to function as a communication node claimed in claim 8.

* * * * *